United States Patent
Tay

(10) Patent No.: US 8,630,504 B2
(45) Date of Patent: Jan. 14, 2014

(54) AUTO-FOCUS IMAGE SYSTEM

(76) Inventor: Hiok Nam Tay, Singapore (SG)

( * ) Notice: Subject to any disclaimer, the term of this patent is extended or adjusted under 35 U.S.C. 154(b) by 33 days.

(21) Appl. No.: 13/492,842

(22) Filed: Jun. 9, 2012

(65) Prior Publication Data

US 2013/0182961 A1 Jul. 18, 2013

Related U.S. Application Data

(60) Provisional application No. 61/587,105, filed on Jan. 16, 2012.

(51) Int. Cl.
*G06K 9/42* (2006.01)

(52) U.S. Cl.
USPC ........... 382/255; 382/168; 382/263; 382/266; 382/271; 348/606; 348/625

(58) Field of Classification Search
USPC .......... 382/168, 255, 263, 266, 271; 348/606, 348/625
See application file for complete search history.

(56) References Cited

U.S. PATENT DOCUMENTS

| | | | | |
|---|---|---|---|---|
| 5,953,440 A * | 9/1999 | Zhang et al. | .................. | 382/117 |
| 6,097,847 A * | 8/2000 | Inoue | ............................ | 382/266 |
| 7,099,518 B2 * | 8/2006 | Li et al. | .......................... | 382/255 |
| 7,899,264 B2 * | 3/2011 | Stewart | .......................... | 382/255 |
| 8,264,591 B2 * | 9/2012 | Yeo et al. | ....................... | 348/345 |
| 8,457,431 B2 * | 6/2013 | Tay | ................................. | 382/255 |
| 2004/0081370 A1 * | 4/2004 | Murphy | ......................... | 382/286 |
| 2006/0029284 A1 * | 2/2006 | Stewart | ........................ | 382/255 |
| 2010/0128144 A1 * | 5/2010 | Tay | ............................. | 348/229.1 |
| 2012/0314121 A1 * | 12/2012 | Tay | ................................ | 348/349 |

OTHER PUBLICATIONS

Edge characterization using normalized edge detector, Donna J Williams.,CVGIP vol. 55 # 4, Jul. 1993, pp. 311-318.*

* cited by examiner

*Primary Examiner* — Jayesh A Patel

(57) ABSTRACT

An auto-focus image system includes a focus signal generator and a pixel array coupled thereto that captures an image that includes a plurality of edges. The generator computes a focus signal from a plurality of edge-sharpness measures, each measured from and contributed by a different edge as a quantity with a unit that is a power of a unit of length. The generator reduces a relative weight of the contribution of an edge depending on a shape of a normalized gradient profile of the edge as identified by an n-tuple of values of n different shape measures (n≥2). Each shape measure varies across normalized gradient profiles of different shapes. One shape measure may be the edge-sharpness measure itself. The weight may be zero if the n-tuple falls outside a predetermined region. At least one symmetrical shape that has perfect reflection symmetry receives reduced weight.

22 Claims, 20 Drawing Sheets

|    | C1      | C2       | C3       | C4      | C5      | C6      |
|----|---------|----------|----------|---------|---------|---------|
| R1 | 10 9 V  | 10 10 V  | 10 9 V   | 2 0     | 0 0     | 0 0     |
| R2 | 3 0     | 10 8 V   | 10 11 V  | 9 10 V  | 1 0     | 0 0     |
| R3 | 1 0     | 3 1      | 8 8 V    | 9 11 V  | 7 8 V   | 1 0     |
| R4 | 0 0     | 1 0      | 3 2      | 7 8 V   | 8 10 V  | 7 8 V   |
| R5 | 0 -2    | 0 0      | 1 1      | 3 3     | 7 12 H  | 6 12 H  |
| R6 | 0 -1    | 0 -1     | 0 0      | 1 2     | 3 0 V   | 1 8 H   |

$b = a \cos\phi$ corrects edge width for slant angle $\phi$

AUTO-FOCUS IMAGE SYSTEM

CROSS-REFERENCE TO RELATED APPLICATIONS

This patent application claims priority under 35 U.S.C. §119(e) to U.S. Provisional Patent Application No. 61/587,105 filed on Jan. 16, 2012.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a position of a focus lens ("focus position"). There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto-focus image system includes a pixel array and a focus signal generator coupled to the pixel array. The pixel array captures an image that includes a plurality of edges. The generator generates a focus signal computed from a plurality of edge-sharpness measures, each being measured from and contributed by a different one of the plurality of edges. The edge-sharpness measure is a quantity that has a unit that is a power of a unit of length.

The generator reduces a relative extent to which an edge contributes to the focus signal on basis of at least two shape measures determined differently by the shape of a normalized gradient profile of the edge. Each shape measure varies across normalized gradient profiles of different shapes. One of the shape measures may be the edge-sharpness measure of the edge itself. The edge may be prevented from contributing altogether, i.e. given weight of zero, if an n-tuple of values of the shape measures falls outside a predetermined region, n being the number of the shape measures. At least one shape that has perfect reflection symmetry is either edge rejection or given reduction of weight.

Listed below are enumerated aspects of the invention.

1. A method for generating a focus signal from a plurality of edges of an image of a scene to indicate a degree of image sharpness, comprising:

determining a relative extent to which an edge will weigh in contributing to the focus signal as compared with other edges that contribute to the focus signal, wherein the relative extent is assigned a value at least according to a shape of a normalized gradient profile of the edge, the shape being identified by an n-tuple of values of n different shape measures (n≥2), each one of the n different shape measures being variable across normalized gradient profiles of different shapes, the n different shape measures being mutually independent, determination of each one of the n different shape measures requiring no more information than a normalized gradient profile of the edge, wherein at least one shape of the normalized gradient profile that has perfect reflection symmetry is either rejected or causes a reduction of the relative extent.

2a. The method of aspect 1, wherein the determining includes:

evaluating a contrast over a portion of the edge, the contrast being less than an edge contrast of the edge.

2b. The method of aspect 2a, wherein the determining further includes:

evaluating another contrast over another portion of the edge.

3. The method of any one of the above aspects, wherein a first shape measure among the n shape measures is a contrast over a portion of the edge divided by a gradient or by another contrast over another portion of the edge, the portion and the another portion being predefined relative to the edge, one or both of the contrast and the another contrast being less than an edge contrast of the edge.

4. The method of aspect 3, where the first shape measure is different from an edge-sharpness measure that is contributed to the focus signal.

5. The method of any one of the above aspects, wherein the n different shape measures do not depend on detection of another edge.

6. The method of any one of the above aspects, wherein one of the n different shape measures is compared with a threshold that is determined by the rest of the n different shape measures.

7. The method of any one of the above aspects, wherein the relative extent is a function of the n-tuple.

8. The method of any one of the above aspects, wherein the relative extent is a weight for the edge in contributing to the focus signal.

9. The method of any one of the above aspects, wherein each edge that contributes to the focus signal contributes an edge-sharpness measure that is a quantity that is computed from a plurality of samples of image data within a predetermined neighborhood of said each edge, wherein the edge-sharpness measure has a unit that is a power of a unit of length, given that each sample of image data has a unit that is a unit of energy, that a distance between gradients and a count of pixels both have a unit that is a unit of length, that a difference between any pair of samples of image data divided by a distance between the pair of samples has a unit that is a unit of energy divided by a unit of length, that gradient value has a unit that is a unit of energy divided by a unit of length, and that normalized gradient values are unitless.

10. The method of Aspect 9, wherein the edge-sharpness measure is also one of the n different shape measures.

11. The method of Aspect 9, wherein the edge-sharpness measure is not part of the n different shape measures.

12. The method of Aspect 11, wherein the edge-sharpness measure is not evaluated for an edge that is not permitted to contribute to the focus signal.

13. The method of Aspect 11, wherein the edge-sharpness measure involves determining a width of a predefined portion of said each edge predefined according to a predetermined manner.

14. The method of Aspect 11, wherein the edge-sharpness measure is a peak gradient value of said each edge divided by an edge contrast across said each edge or by a contrast over a predefined portion of said each edge.

15. The method of Aspect 11, wherein the edge-sharpness measure is a second moment of gradients from a sequence of gradients across said each edge.

16. The method of any one of the above aspects, wherein each one of the plurality of edges consists of a plurality of pixels arrayed contiguously in a first direction and is detected by an edge detector.

17. The method of Aspect 16, wherein the edge detector detects said each edge using a first-order edge detection operator.

18. The method of any one of the above aspects, wherein different edges have different neighborhood of pixels from which the n different shape measures and the edge-sharpness measure of the respective one of the different edges are computed.

22. The method of any one of the above aspects, wherein the n different shape measures change by less than 10% for a 20% downscaling of image data of the image.

25. The method of any one of the above aspects, wherein at least one of the n different shape measures is any one of a normalized gradient value, a difference between normalized gradient values, a first derivative of normalized gradient, and an area under the normalized gradients plotted against distance, normalizing being dividing by a peak gradient value or by an interpolated peak gradient value of said any edge.

26. The method of any one of the above aspects, wherein at least one of the n different shape measures is a normalized (interpolated) gradient value at a predefined location of said any edge, normalizing being dividing by a peak gradient value or by an interpolated peak gradient value of said any edge.

27. The method of any one of the above aspects, wherein at a predefined distance from a peak gradient or interpolated peak of a sequence of gradients across said any edge.

28. The method of any one of the above aspects, wherein at least one of the n different shape measures involves determining a width of a predefined portion of said any edge and is not the edge-sharpness measure.

29. The method of any one of the above aspects, wherein each of at least two of the n different shape measures involves determining a width of a different predefined portion of said any edge.

30. The method of any one of the above aspects, wherein the edge-sharpness measure of said any edge involves determining a width of a predefined portion of said any edge.

31. The method of Aspect 28 or 29 or 30, wherein the predefined portion contributes a predetermined fraction of an edge contrast of said any edge.

32. The method of Aspect 28 or 29 or 30, wherein the predefined portion consists of all pixels of said any edge which have normalized gradient values above a predetermined threshold.

33. The method of Aspect 28 or 29 or 30, wherein the predefined portion is defined with respect to at least one feature from a sequence of normalized second order derivatives across said any edge.

34. The method of Aspect 28 or 29 or 30, wherein the predefined portion is an undivided portion between any two of the following from a sequence of normalized second order derivatives across said any edge: (a) a positive peak (or interpolated peak); (b) a negative peak (or interpolated peak); (c) a zero crossing; (d) a first positive second derivative with a predetermined first magnitude and located between the zero crossing and the positive peak; (e) a first negative second derivative with a predetermined second magnitude and located between the zero crossing and the negative peak; (f) a second positive second order derivative with a predetermined third magnitude and located outside a span between the positive and negative peaks; and (g) a second negative second order derivative with a predetermined fourth magnitude and located outside the span.

35. The method of aspect 34, wherein either:
the first and second magnitudes are same, and the third and fourth magnitudes are same; or
the first and third magnitudes are same, and the second and fourth magnitudes are same.

36. The method of any one of the above aspects, wherein at least one of the n different shape measures of said any edge other than the edge-sharpness measure measures a distance between a gradient/interpolated gradient and another gradient/interpolated gradient, both being part of a sequence of gradients across said any edge and sharing a gradient value at a given percentage down from a peak gradient or an interpolated peak of the sequence of gradients.

37. The method of any one of the above aspects, wherein at least one of the n different shape measures of said any edge other than the edge-sharpness measure measures an area of a region under a sequence of gradients of said any edge plotted against distance, the area being normalized by a peak gradient value or an interpolated peak gradient value of the sequence of gradients.

38. The method of any one of the above aspects, wherein at least one of the n different shape measures of said any edge other than the edge-sharpness measure is a peak gradient value of a sequence of gradients across said any edge divided by an edge contrast of said any edge.

39. The method of any one of the above aspects, wherein at least one of the n different shape measures of said any edge is a function of distances of a plurality of gradients of a sequence of gradients across said any edge from a predefined position of said any edge.

40. The method of Aspect 39, wherein the predefined position is a center of gravity of a plurality of gradients of said any edge, gradient values being treated as weights.

41. The method of Aspect 39 or 40, wherein the function measures a k-th central moment of a plurality of gradients about the predefined position, k being a positive even integer.

42. The method of any one of the above aspects, wherein at least one of the n different shape measures of said any edge other than the edge-sharpness measure of said any edge is a sum of a power of a plurality of gradient values from a sequence of gradients across said any edge normalized by the power of a gradient value or an interpolated gradient value of the sequence of gradients.

43. The method of Aspect 42, wherein each gradient value among the plurality of gradient values either exceeds or is equal to a predetermined fraction of a peak gradient value or an interpolated peak gradient value of the sequence of gradients.

44. The method of Aspect 43, wherein for each gradient value among the plurality of gradient values, a constant equal to the predetermined fraction is subtracted from each one of the plurality of gradient values prior to taking the power.

45. The method of any one of the above aspects, wherein the edge-sharpness measure of said any edge measures a distance between a gradient/interpolated gradient and another gradient/interpolated gradient, both being part of a sequence of gradients across said any edge and sharing a gradient value at a given percentage down from a peak gradient or an interpolated peak of the sequence of gradients.

46. The method of any one of the above aspects, wherein the edge-sharpness measure of said any edge measures an area of a region under a sequence of gradients of said any edge plotted against distance, further divided by a gradient value or an interpolated gradient value of the sequence of gradients.

47. The method of any one of the above aspects, wherein the edge-sharpness measure of said any edge is a peak gradient value of a sequence of gradients across said any edge divided by an edge contrast of said any edge.

48. The method of any one of the above aspects, wherein the edge-sharpness measure of said any edge is a function of distances of a plurality of gradients of a sequence of gradients across said any edge from a predefined position of said any edge.

49. The method of Aspect 48, wherein the predefined position is a center of gravity of a plurality of gradients of said any edge, gradient values being treated as weights.

50. The method of Aspect 48 or 49, wherein the function measures a k-th central moment of the plurality of gradients about the predefined position, k being a positive even integer.

51. The method of Aspect 48, wherein each gradient value among the plurality of gradient values either exceeds or is equal to a predetermined fraction of a peak gradient value or an interpolated peak gradient value of said any edge.

52. The method of Aspect 51, wherein for each gradient value among the plurality of gradient values, a constant equal to the predetermined fraction is subtracted from each one of the plurality of gradient values prior to taking the power.

53. The method of any one of the above aspects, further comprising:
storing the edge in a memory depending on the relative extent.

54. The method of any one of the above aspects, further comprising:
displaying the edge on a display depending on the relative extent.

55. The method of any one of the above aspects, wherein the relative extent is computed by a computing device that comprises a buffer to store at least a portion of the image at a time.

56. The method of any one of the above aspects, wherein the relative extent assigns different values to different shapes that have perfect reflection symmetry.

57. The method of any one of the above aspects, wherein there is a spurious sequence of gradients having perfect reflection symmetry such that if the edge has the spurious sequence of gradients across itself then the relative extent is reduced.

58. The method of Aspect 57, wherein the spurious sequence of gradients is {0, 0.2, 0.2, 0.7, 0.7, 1, 0.7, 0.7, 0.2, 0.2, 0}.

59. The method of any one of the above aspects, wherein not more than one of the n different shape measures of said any edge involve measuring widths or pixel counts at different gradient levels from a sequence of gradients across said any edge.

60. The method of any one of the above aspects, wherein the n different shape measures include at least two shape measures that are evaluated from a sequence of gradients across said any edge, not both the at least two shape measures depend on gradients to both sides of a peak gradient of the sequence of gradients.

61. The method of any one of the above aspects, wherein the n different shape measures include a pair of shape measures neither of which is computed from one positive gradient and one negative gradient for said any edge.

63. The method of any one of the above aspects, wherein a 20% decrease in an illumination of the scene will not result in a difference between whether the edge is omitted or allowed to contribute to the focus signal.

65. The method of any one of the above aspects, wherein at least one of the n different shape measures involves a third order derivative of a sequence of image samples across the edge.

66. The method of aspect 65, wherein the third order derivative is determined through fitting a third degree polynomial to a middle portion of the sequence of image samples.

67. The method of aspect 65, wherein the third order derivative is determined through fitting a second degree polynomial to a sequence of gradients across the edge.

68. The method of aspect 65, where the third order derivative is determined through estimating a zero-crossing slope of a sequence of second derivatives across the edge.

69. The method of any one of aspects 65 to 68, wherein the third order derivative is normalized such that there is no unit of energy in its unit.

70. The method of any one of aspects 65 to 69, wherein the third order derivative is normalized by dividing by either a (interpolated) peak gradient value or an edge contrast of the edge.

71. The method of any one of the above aspects, wherein at least one of the n different shape measures involves finding a contrast over a predefined portion of the edge.

72. The method of aspect 71, wherein the predefined portion extends to both sides of a midpoint where a sequence of image samples across the edge is midway through its transition.

73. The method of aspect 71, wherein the predefined portion is entirely to one side of a midpoint where a sequence of image samples across the edge is midway through its transition.

74. The method of any one of aspects 72 and 73, wherein the midpoint is instead defined as a midpoint between two (interpolated) gradients of same magnitude on opposite sides of a peak gradient.

75. The method of any one of aspect 71 to 74, wherein the predefined portion has a predetermined width.

76. The method of any one of the above aspects, wherein at least one of the n different shape measures involves finding a width of a portion of the edge, the portion has a prescribed fraction of an edge contrast of the edge.

77. The method of any one of aspects 71 to 76, wherein the predefined portion (or the portion) is an undivided portion.

78. The method of any one of aspects 71 to 76, wherein the predefined portion (or the portion) is constituted by a plurality of undivided portions.

79. The method of any one of the above aspects, wherein at least one of the n different shape measures involves normalizing by a gradient or by an interpolated gradient.

80. The method of any one of the above aspects, wherein at least one of the n different shape measures involves normalizing by an edge contrast across the respective edge or by a contrast over a predefined undivided portion or by a total contrast over two or more predefined undivided portions of the respective edge instead of by a peak gradient or an interpolated peak gradient of the respective edge.

90. A computer-readable medium that comprises computer-executable instructions that, when executed by a computing device, causes the computing device to execute a method according to any one of the above method aspects.

91. A circuit that generates a focus signal from a plurality of edges of an image of a scene to indicate a degree of image sharpness, comprising:
an edge detection and width measurement (EDWM) unit; and,
a focus signal calculator,
wherein the EDWM unit detects edges in image data of the image, determines for the edges the relative extents to which they will contribute respectively to the focus signal, and evaluates edge-sharpness measures for edges that will contribute to the focus signal,
wherein the focus signal calculator generates a focus signal from the edge-sharpness measures, taking into account the respective relative extents,
wherein the EDWM unit implements a method described in any one of the above method aspects.

92. An image capture system, comprising:
a focus lens;
an aperture;
an image sensor comprising an image sensing pixel array;
a focus lens motor means; and,
a circuit according to aspect 91.

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
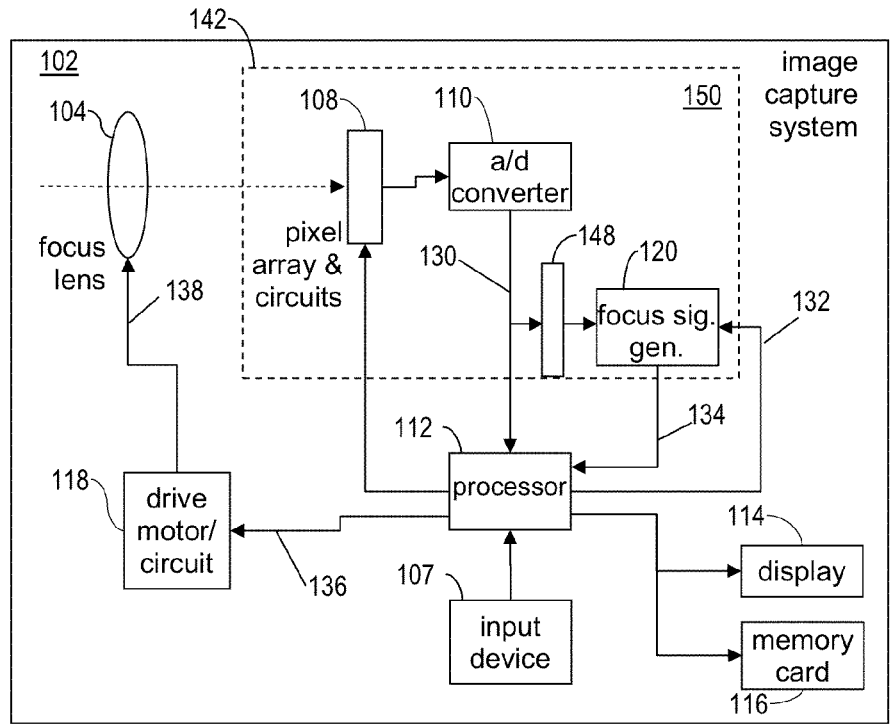
FIG. 1 is a schematic of an embodiment of an auto-focus image pickup apparatus.
Figure 2:
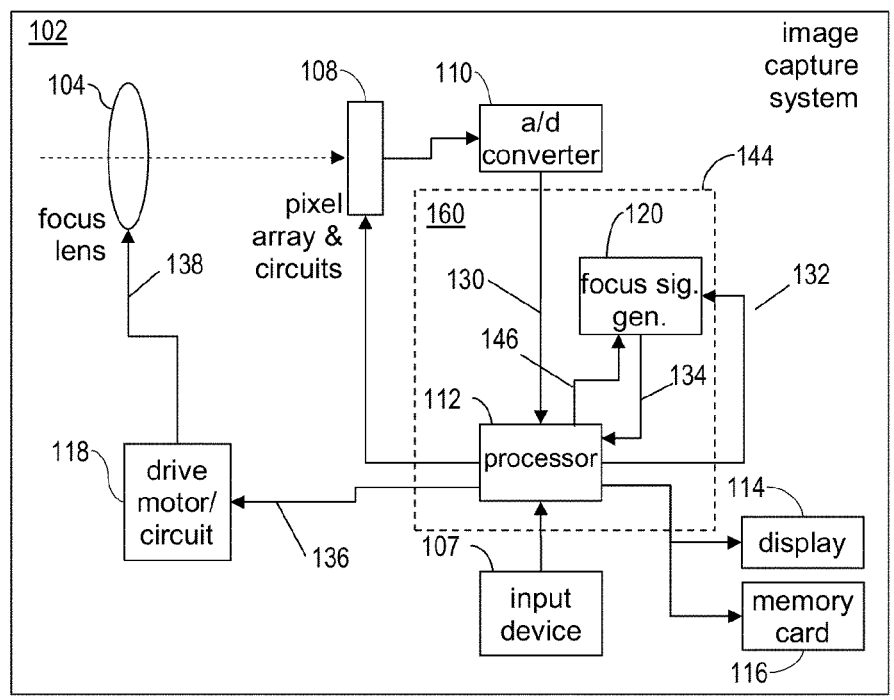
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternatively, the pixel array and circuits 108, A/D Converter 110, and focus signal generator 120 may reside within a package 142 as image sensor 150 shown in FIG. 1, separate from the processor 112. Alternatively, the focus signal generator 120 and processor 112 may together reside within a package 144 as a camera controller 160 shown in FIG. 2, separate from the pixel array 108 and A/D Converter 110. The focus signal generator 120 (or any alternative embodiment, such as one shown in FIG. 30) and the processor 112 may together reside on a semiconductor substrate, such as a silicon substrate.

Focus Signal Generator

Figure 3:
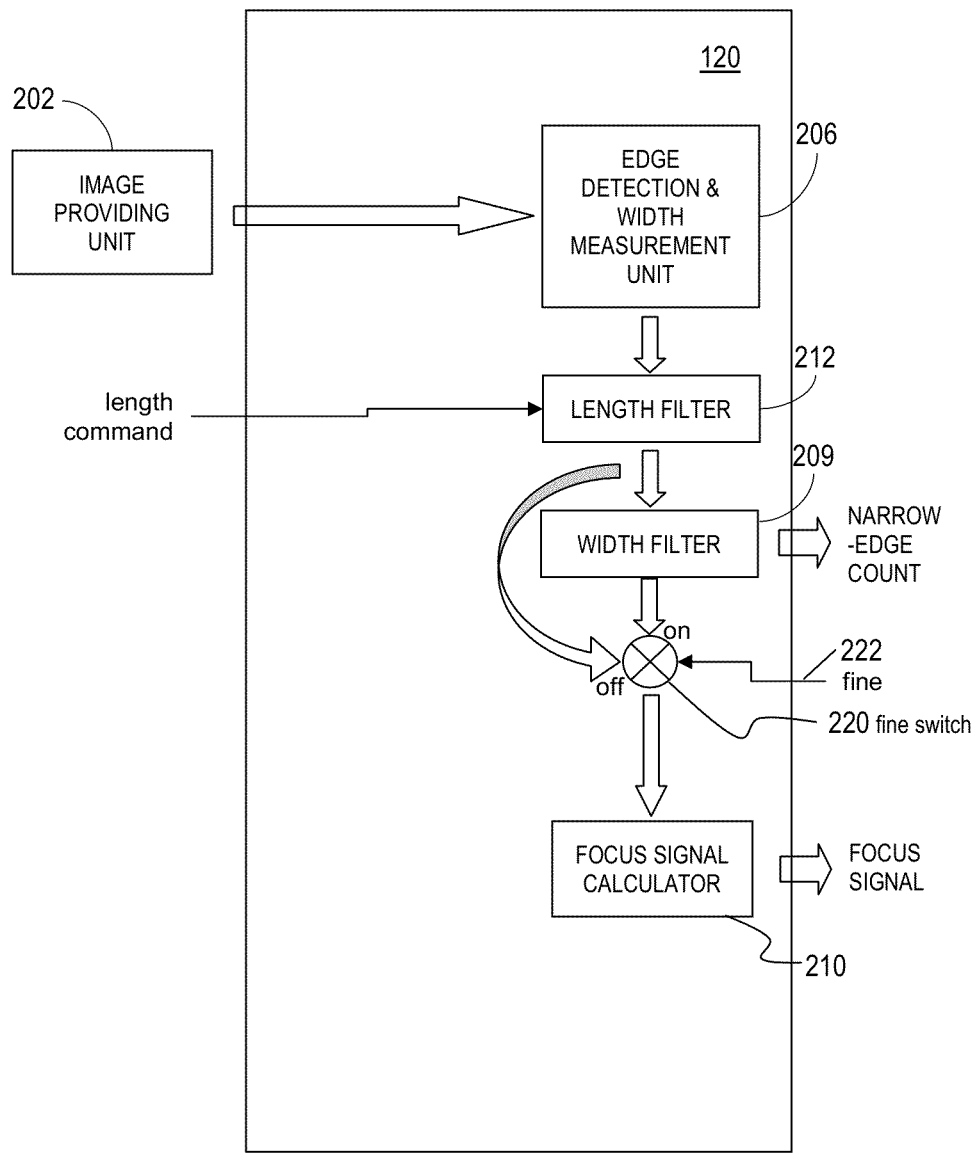
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, and a width filter 209. It may further comprise a fine switch 220 controlled by input 'fine' 222. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternatively, both fine focus signal and gross focus signal may be calculated and output as part of output signals 134. The edge detection & width measurement unit 206 receives image(s) provided by the image providing unit 202. In the context of FIGS. 1 and 2, control signals, such as control signal 'fine' 222, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation Y=0.2126*R+0.7152*G+ 0.0722*B, where Y is luminance value. The single image signal may then be processed by a Gaussian filter or any lowpass filter to smooth out image data sample values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

The focus signal generator includes an edge detector to identify an edge in an image signal. The edge detector may use a first-order edge detection operator, such as Sobel operator, Prewitt operator, Roberts Cross operator, or Roberts operator. The edge detector may use a higher-order edge detection operator to identify the edge, for example a second order operator such as a Laplacian operator. The edge detector may use any one of the known edge detection operators or any improved operator that shares a common edge detection principle of any of the known operators.

Where the edge detector uses a first-order edge detection operator, a gradient (i.e. first derivative) of the image signal is computed. There are various methods available to calculate the gradient, including using any one of various first order edge detection operators such the Sobel operator, the Prewitt operator, the Roberts Cross operator, and the Roberts operator. The Roberts operator has two kernels which are single column or single row matrices: [−1+1] and its transpose. The Roberts Cross operator has two kernels which are 2-by-2 matrices: [+1, 0; 0, −1] and [0, +1; −1, 0], shown in the format of [<first-row vector; second-row vector; third-row vector] like in Matlab. The Prewitt and the Sobel operator are basically have the same kernels, [−1, 0, +1] taking gradient in a direction of the row and its transpose taking gradient in a direction of the column, further multiplied by different lowpass filter kernels performing lowpass filterings perpendicular to the respective gradient directions. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation Sx[k, q]=U[k, q+1]−U[k, q−1]. Sobel Y-operator at the same location is given by the equation Sy[k,q]=U[k+1, q]−U[k−1, q], where U is an image signal of the processed image.

Where the edge detector uses a second-order operator, a second derivative (such as the Laplacian) of the image signal is computed.

Orientation Tagging

Figures 4, 5:
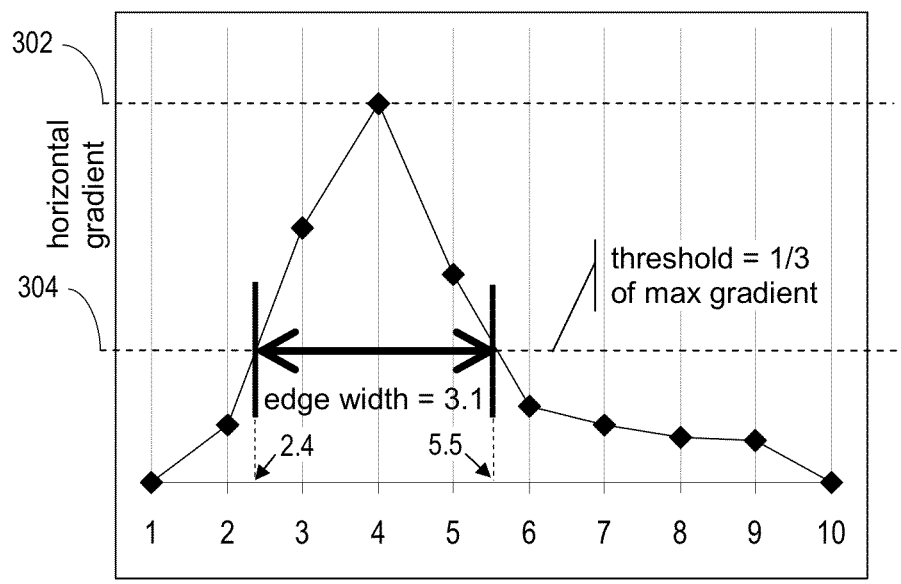
FIG. 4 is an illustration of a horizontal Sobel operator's operation on a image signal matrix.
FIG. 5 illustrates a calculation of edge width from a horizontal gradient.

Each pixel may be tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel may be tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has a direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Another alternative edge width calculation method is to calculate a difference of the image signal across the edge (with or without edge refinement) and divide it by a peak gradient of the edge.

Alternatively, edge width may be a distance between a pair of positive and negative peaks (or interpolated peak(s)) of the second order derivative of the image signal across the edge. Other alternatives are possible, to be described under the heading "edge-sharpness measure" further into this specification.

It will be seen further into this specification under the heading "edge-sharpness measure" that there are other alternatives than a width, which is merely one example of a edge-sharpness measure that is essentially independent of illumination of the scene.

Slant Correction

Figures 6A, 6B:
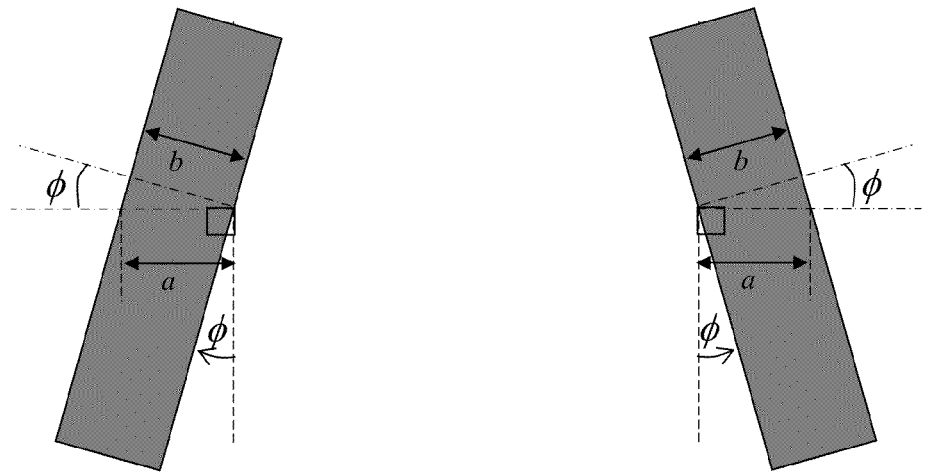
FIGS. 6A, 6B are illustrations of a calculation of an edge width of a vertical edge having a slant angle φ.

Although each edge may be assigned to one prescribed direction (e.g. vertical direction or horizontal direction) or another, perpendicular, prescribed direction (e.g horizontal direction or vertical direction) and may have its edge width measured in a direction perpendicular to that assigned edge direction, the boundaries between regions of different image signal values in the image from which these edges arise may not be and usually are not aligned perfectly with either prescribed directions. In FIG. 6A, a boundary (shaded band) is shown to be inclined at a slant angle φ with respect to the vertical dashed line, and a width a is shown to be measured in the perpendicular direction (i.e. horizontal direction). However, a width b (as indicated in the drawing) measured in a direction perpendicular to the direction of the boundary (also direction of an edge that forms a part of the boundary) is more appropriate as the width of the boundary (and also of the edge) than width a. Such widths a that are not measured perpendicularly to the respective edge directions tend to be too large and do not represent the genuine thickness of the respective boundaries.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction) and that has the angle φ. The corrected width b may then be obtained from a projection of the measured width a to the direction perpendicular to the edge direction. From elementary trigonometry, such a projection may be given by b=a cos(φ), but approximation may be used as long as it obtains accuracy to within 20%. The angle φ, or cos(φ) itself, may be found by any method known in the art for finding a direction of an edge in an image, or by a more accurate method described in the flowchart shown in FIG. 7.

Figures 6C, 6D:
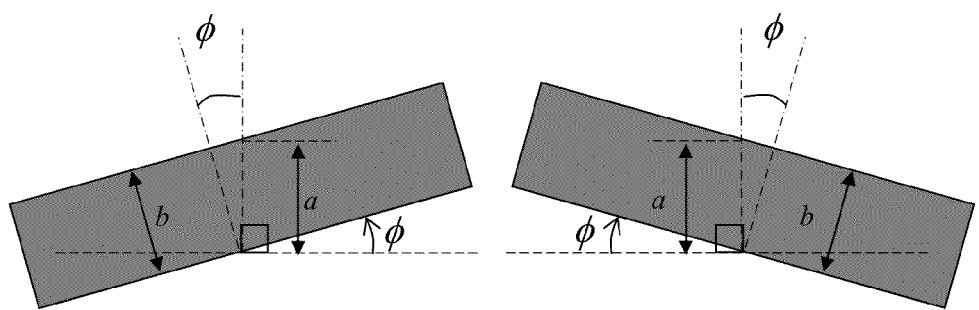
FIGS. 6C, 6D are illustrations of a calculation of an edge width of a horizontal edge having a slant angle φ.

Each horizontal or vertical edge's edge width may be corrected for its slant from either the horizontal or vertical orientation (the prescribed directions), respectively. FIG. 6A, 6B illustrate a correction calculation for an edge width measured in the horizontal direction for a boundary (and hence edges that form the boundary) that has a slant from the vertical line. FIGS. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of cos φ, where φ is an angle of slant from the prescribed direction.

Figures 7, 8:
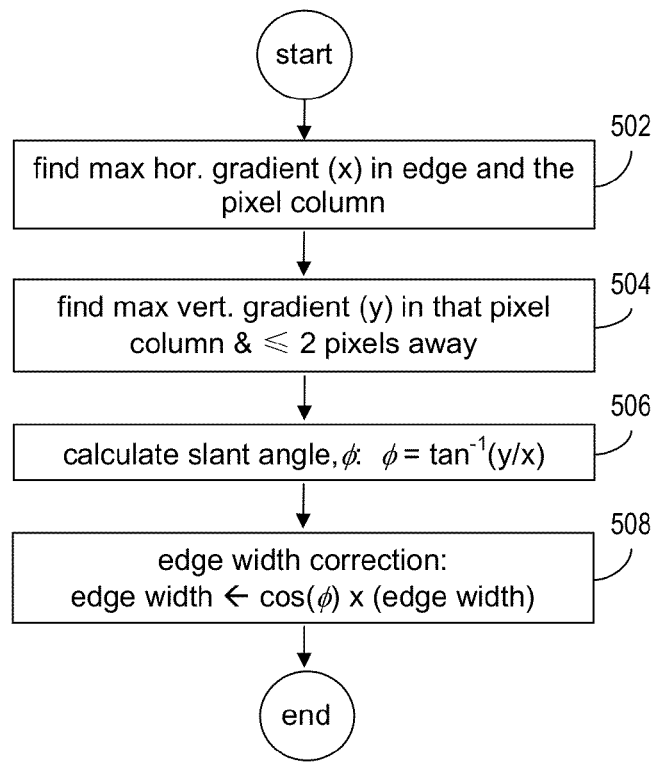
FIG. 7 is a flowchart of a process to calculate a slant angle φ and correct an edge width for a vertical edge having a slant.
FIG. 8 is an illustration of a vertical concatenated edge.

By way of example, FIG. 7 shows a flowchart of a process to correct edge widths for slant for edges inclined from a vertical line. (For horizontal edges, substitute 'row' for 'column', and interchange 'vertical' with 'horizontal' in the flowchart.)

From step 502 to step 506, a slant angle φ is found. For each vertical edge, at step 502, locate the column position where the horizontal gradient magnitude peaks, and find the horizontal gradient x. At step 504, find where the vertical gradient magnitude peaks along the column position and within two pixels away, and find the vertical gradient y.

At step 506, find the slant angle $\phi=\tan^{-1}(y/x)$. At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with cos(φ), or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to $\cos(\tan^{-1}(y/x))$ to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then use q to input to a lookup table that has entries for various values of q. For each value of q, the lookup table returns an edge width correction factor. The edge width correction factor may be an approximation to $\cos(\tan^{-1}(q))$ to within 20%, preferably within 5%.

For finding the slant angle φ (or an approximation thereto such that the correction factor is accurate to within 20%) and subsequently the correction factor cos(φ) (or an approximation thereto), or to directly find the correction factor without finding the slant angle φ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find q=y/x for this pixel, and (c) find a correction factor that corresponds to q, for instance $\cos(\tan^{-1}(q))$ or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

Other modifications are possible along these directions or other.

Screen Threshold

Figure 9A:
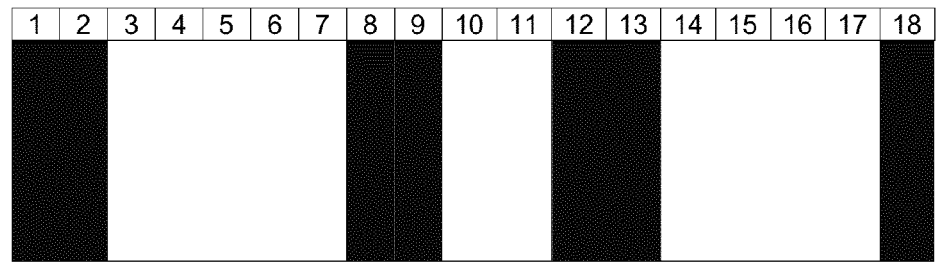
FIG. 9A is an illustration of a group of closely-packed vertical bars.
Figure 9B:
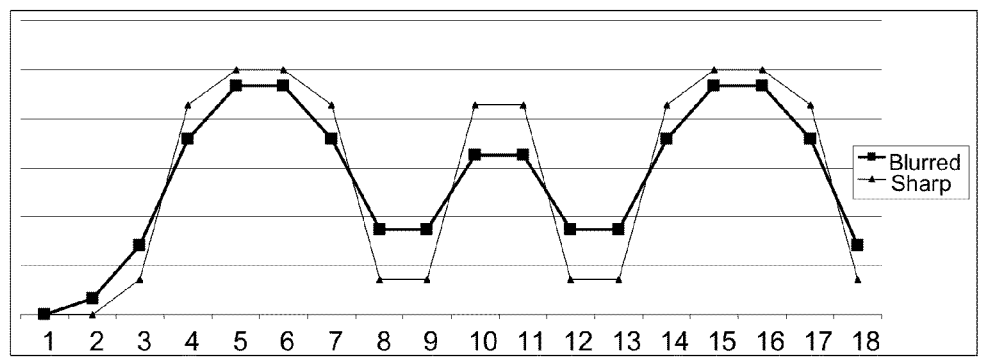
FIG. 9B is a graph of an image signal across FIG. 9A.
Figure 9C:
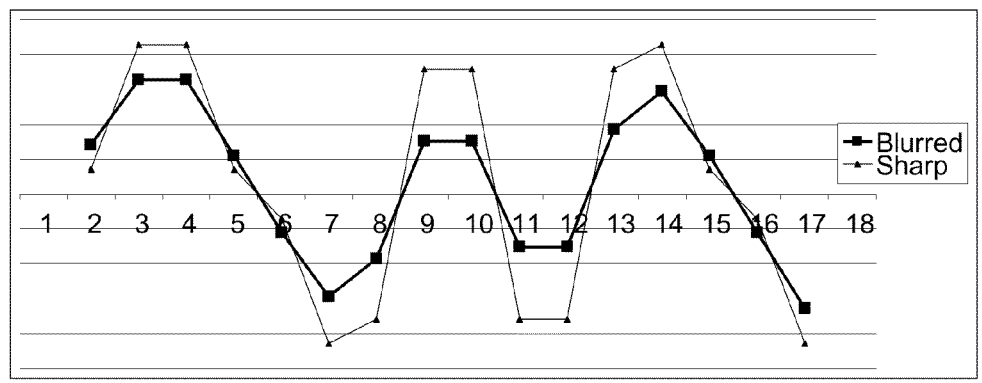
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges. either.

The Edge Detection and Width Measurement Unit 206 may execute the following algorithm for eliminating closely-packed narrower edges based on a screen threshold established from a wider edge, and a modulation screen flag that can be turned on and off.

Figure 10:
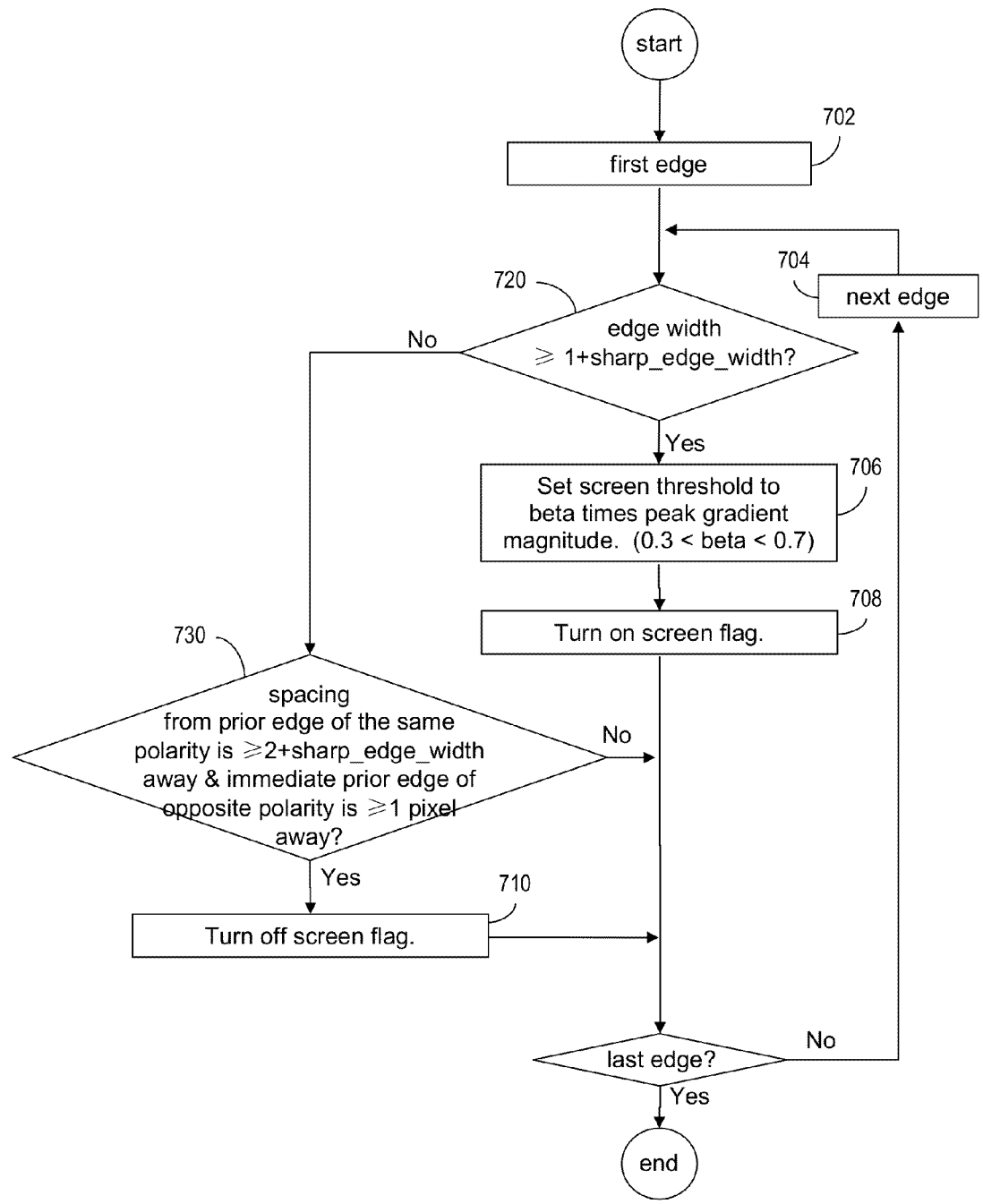
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2. FIG. 10 is a flowchart to determine a screen threshold and a screen flag for each edge. For vertical edges, assume scanning from left to right along a row, though this is not required. (For horizontal edges, assume scanning from top to bottom along a column, though this is not required). A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_ width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

Alternative Embodiments

Orientation of the Pixel Grid

The image input by the focus signal generator 120 may have pixels laid out in a rectangular grid ("pixel grid") rotated at 45 degrees with respect to a rectangular frame of the image. In this case, the X- and Y-directions of the edge detection operations and width measurement operations may be rotated likewise.

Edge-Sharpness Measures:

In the above description, sharpness of image of an edge is represented by a width of the edge. There are alternatives. This inventor recognizes that, in essence, what underlies the focus signal generated in this manner is that each of the individual edges contributes a variable quantity (hereinafter "edge-sharpness measure") that is independent of scaling the image data by, for example, 20%, or essentially independent, such as changes by not more than 5% for 20% down-scaling of the image data, thus helping to make the focus signal independent of or far less dependent on illumination of the scene of the image or reflectivity of objects in the scene compared with the conventional contrast detection method.

In the present focus signal generator 120, any variable quantity that is computed from image data samples of the edge and that has the above characteristic of being independent of or essentially independent of 20% scaling down of the image data in addition is a good alternative to the edge width.

The alternative edge-sharpness measure preferably has a unit that does not include a unit of energy. The unit of the edge-sharpness measure is determined on basis two points: (a) each sample of the image data on which the first-order edge-detection operator operates on has a unit of energy, (b) distance between samples has a unit of length. On basis of points (a) and (b), a gradient value has a unit of a unit of energy divided by a unit of length. Likewise, contrast across the edge or across any undivided portion of the edge has a unit of energy, being a difference between a pair of samples of the image data. Therefore, the contrast is not a good edge-sharpness measure, as the unit has a unit of energy and thus reveals that it is affected by illumination of the scene and reflectivity of the object. Neither is peak gradient of the edge, because the unit of the peak gradient has a unit of energy in it, indicating also that it is responsive to a change in illumination of the scene. On the other hand, peak gradient of the edge divided by a contrast of the edge is a good edge-sharpness measure, as it has a unit of the reciprocal of a unit of length. As another example, the count of gradients whose gradient values exceeds a certain predetermine fraction of the peak gradient is a good edge-sharpness measure, as the count is simply a measure of distance quantized to the size of the spacing between contiguous gradients, hence having a unit of length.

It is here noted that, in the generation of the edge-sharpness measure, a gradient may be generated from a first-order edge detection operator used to detect the edge, or may be generated from a different first-derivative operator (i.e. gradient operator). For example, while the Sobel operator (or even a second-order edge detection operator, such as a Laplacian operator) may be used to detect the edge, the Roberts operator whose kernels are simply [−1, +1] and its transpose, which is simply subtracting one sample of the image data from the next sample in the orientation of the gradient operator, with the resulting gradient located midway between the two samples. Edges may be detected with a higher-order edge detection operator than first-order independently of one or more derivative operators used in generating the edge-sharpness measure or any of the shape measures described in the next section.

In summary, the edge-sharpness measure should have a unit of a power of a unit of length, for example a square of a unit of length, a reciprocal of a unit of length, the unit of length itself, or a square-root of a unit of length. In particular, for certain edge-sharpness measures other than conventional edge widths, the powers are other than ±1.

Any such alternative edge-sharpness measure can replace the edge width in the focus signal generator 120.

To correct for a slant of the edge, the correction factor as described above with reference to FIGS. 6A-6D and FIG. 7 (hereinafter "width correction factor") should be converted to adopt the same power. For example, if the edge-sharpness measure is peak gradient divided by a contrast, which gives it a unit of the reciprocal of a unit of length, then the appropriate correction factor for the edge-sharpness measure is the reciprocal of the correction factor described with reference to FIGS. 6A-6D and FIG. 7 above. As another example, if the edge-sharpness measure has a unit of a square of a unit of length, then the slant correction factor for the edge-sharpness measure should be a square of the width correction factor.

Several examples of alternative edge-sharpness measures are described below with reference to the drawings in FIG. 24B, FIG. 24D, FIG. 25, and FIG. 26.

Figure 24A:
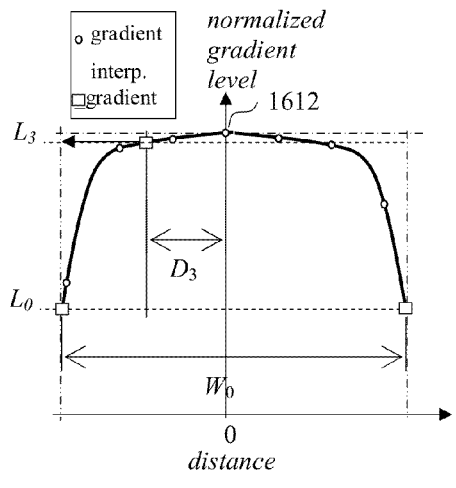
FIG. 24A illustrates a symmetrical sequence of gradients across an edge plotted against distance in multiples of a spacing between successive gradients, and a normalized gradient value of an interpolated gradient at a predefined distance from a peak gradient.
Figure 24B:
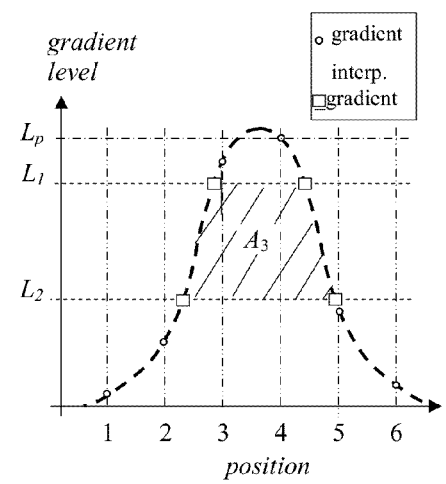
FIG. 24B illustrates a sequence of gradients across an edge plotted against distance in multiples of a spacing between successive gradients, and an area of a region under the plotted sequence of gradients.

FIG. 24B illustrates a sequence of gradients across an edge plotted against distance in multiples of a spacing between successive gradients, and an area $A_3$ of a shaded region under the plotted sequence of gradients. In this example, the region is defined between two gradient levels $L_1$ and $L_2$, which may be defined with respect to an interpolated peak gradient value (alternatively, the peak gradient value) of the sequence of gradients as, for example, a predetermined fraction of the interpolated peak gradient value. The shaded region has four corners of interpolated gradients. The area divided by the interpolated peak gradient value (alternatively, the peak gradient value) is a good edge-sharpness measure, as it has a unit of length. It is noted that alternative definitions of the region are possible. For example, the region may be bounded from above not by the gradient level $L_1$ but by the sequence of gradients.

Figure 24C:
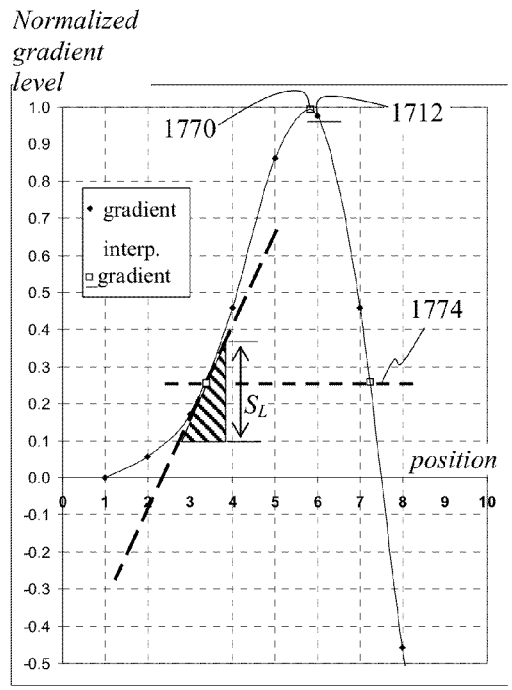
FIG. 24C illustrates a sequence of gradients of an image signal across an edge plotted against distance in multiples of a spacing between successive gradients, and a slope (i.e. second derivative of the image signal) of the plotted sequence of gradients taken at a gradient level defined with respect of an interpolated peak gradient.
Figure 24D:
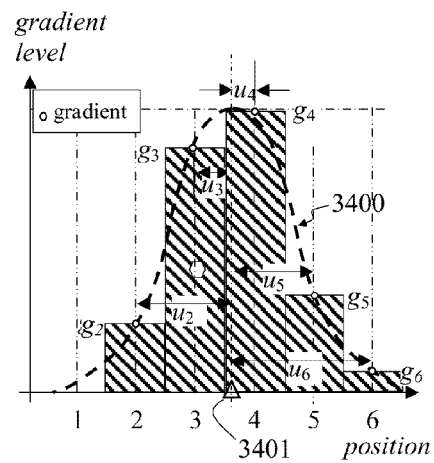
FIG. 24D illustrates a sequence of gradients of an image signal across an edge plotted against distance in multiples of a spacing between successive gradients, a center of gravity (i.e. center of moment), and distances of the gradients from the center of gravity.

FIG. 24D illustrates a sequence of gradients across an edge plotted against distance in multiples of a spacing between successive gradients, a center of gravity 3401 (i.e. center of moment), and distances $u_2$, $u_3$, $u_4$, $u_5$ and $u_6$ of the gradients (having gradient values $g_2$, $g_3$, $g_4$, $g_5$ and $g_6$) from the center of gravity. A good edge-sharpness measure is a k-th central moment of the gradients about the center of gravity, namely a weighted average of the distances of the gradients from the center of gravity with the weights being magnitudes of the respective gradients, k being an even integer. For example, k can be 2, which makes the edge-sharpness measure a variance as if the sequence of gradients were a probability distribution. In this example, the edge-sharpness measure has a unit of a square of a unit of length. More generally, the edge-sharpness measure may be a function of distances of a plurality of gradients of a sequence of gradients from a position predefined relative to the plurality of gradients, the sequence being array across the edge. Instead of the center of gravity, the predefined position may be an interpolated peak position for the sequence of gradients or a midpoint between two interpolated gradients that have same magnitude or a midway of transition of the image signal between a pair of a minimum and a maximum that flanks the edge. A proper subset of the gradients of edge may be chosen according to a predefined criterion to participate in this calculation. For example, the gradients may be required to have gradient values of at least a predetermined fraction of the peak gradient or gradient value of an interpolated peak of the sequence of gradients.

Figure 25:
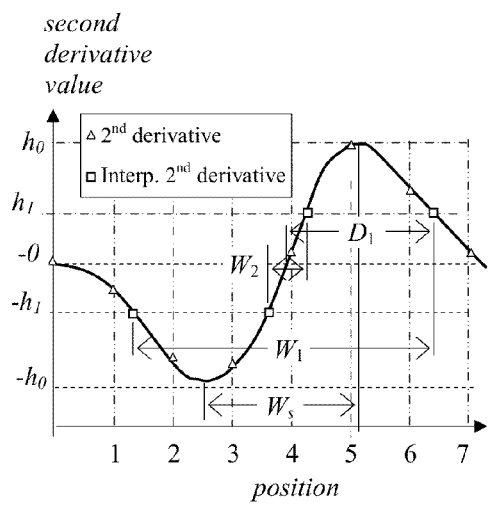
FIG. 25 illustrates a sequence of second derivatives of an image signal across an edge plotted against distance in multiples of a spacing between successive second derivatives, showing (a) a width $W_s$ between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$.

FIG. 25 illustrates a sequence of second derivatives of a sequence of samples of image data across an edge plotted against distance in multiples of a spacing between successive second derivatives, showing (a) a width $W_s$ between a pair of positive and negative peaks, (b) a width $W_1$ between a pair of outermost interpolated second derivatives that have a predefined magnitude $h_1$, (c) a width $W_2$ between an inner pair of interpolated second derivatives that have a predefined magnitude $h_1$, and (d) a distance $D_1$ from a zero-crossing (between the pair of positive and negative peaks) to an outermost interpolated second derivative that has a predefined magnitude $h_1$. Any one of the three widths $W_s$, $W_1$ and $W_2$ may used as the edge-sharpness measure. Additionally, a width from the zero-crossing to any of the peaks or interpolated second derivatives may be used as the edge-sharpness measure as well. The predefined magnitude should be directly proportional to scaling of the image data just like the second derivatives are, so that the positions defined with respect to it do not change under 20% dimming of illumination on the scene. In general, determining the edge-sharpness measure may include computing the second derivatives and measuring a distance that is predefined with respect to the second derivatives.

In the example of FIG. 25, furthermore, the edge-sharpness measure may be a weighted sum of distances from the zero crossing (between the pair of positive and negative peaks, and may be interpolated) of the second derivatives with the weights being magnitudes of the respective second derivatives. More generally, the edge-sharpness measure may be an even-order central moment of the second derivatives from a predefined position (e.g. the zero crossing or, alternatively, a center of gravity, which may be a center of gravity). Even more generally, the edge-sharpness measure may be a function of distances of a plurality of second derivatives across the edge from a predefined position. Other than the zero-crossing position, a center of gravity is a good candidate for the predefined position, with the weights being magnitudes of the second derivatives or magnitudes of the gradients or magnitudes of the image samples. Another candidate for the predefined position is the midpoint between a pair of same-value gradient(s) and/or interpolated gradient(s) on two sides of the peak gradient. Another candidate for the predefined position is a midpoint between an inner pair of same-magnitude (interpolated) second derivatives (see endpoints of width measurement $W_2$ in FIG. 25), or between an outer pair of same-magnitude (interpolated) second derivatives (see endpoints of width measure $W_1$ in FIG. 25), or between a pair of positive peak and negative peak of the second derivatives (see endpoints of width measurement $W_s$ in FIG. 25), or between the beginning and the end (predefined according to a predetermined procedure) of the transition of image signal values across the edge.

Figure 26:
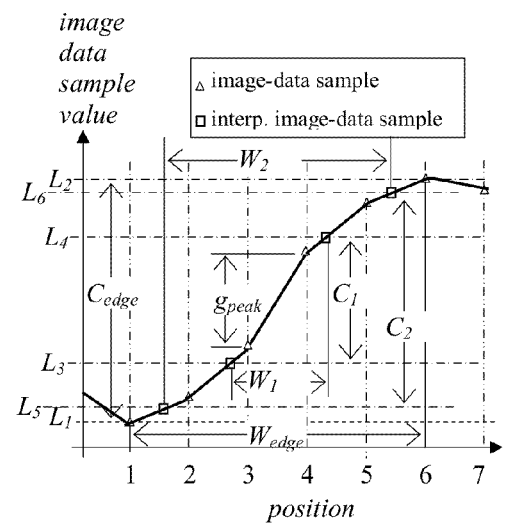
FIG. 26 illustrates a sequence of image data samples of the image signal plotted against distance in multiples of a spacing between successive samples, showing (a) a width $W_{edge}$ and a contrast $C_{edge}$ between two samples at two ends of the edge, (b) a peak gradient value $g_{peak}$ between a pair of samples that has a steepest change of sample value, (c) an undivided portion of the edge that has contrast $C_1$ and (d) an undivided portion of the edge that has contrast $C_2$.
Figure 31A:
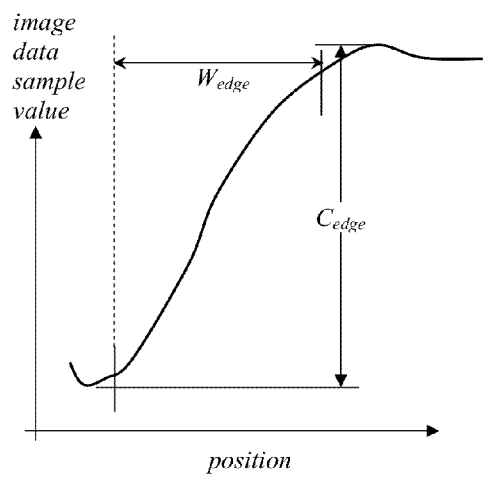
FIGS. 31A-31B illustrate alternative methods to determine an edge contrast $C_{edge}$.
Figure 31B:
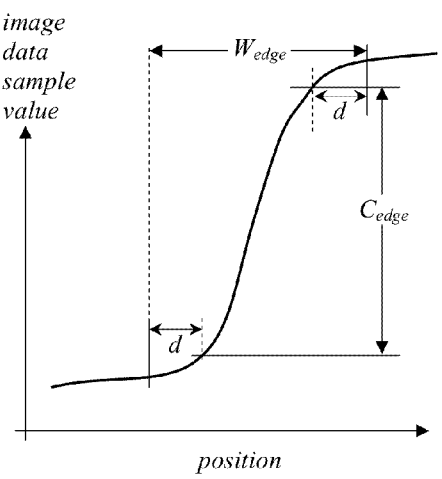

FIG. 26 illustrates a sequence of samples of image data from pixels of an edge plotted against distance in multiples of a spacing between contiguous pixels, showing (a) a width $w_{edge}$ and a contrast $C_{edge}$ between two samples at two ends of the edge, (b) a peak gradient value $g_{peak}$ (generated by the Roberts operator) between a pair of samples that has a steepest change of sample value, (c) an undivided portion of the edge that has contrast $C_1$, and (d) an undivided portion of the edge that has contrast $C_2$. The undivided portion in (c) has width $W_1$. The undivided portion in (d) has width $W_2$. As mentioned before, the peak gradient value $g_{peak}$ divided by the contrast $C_{edge}$ is a good edge-sharpness measure. The width $W_{edge}$ is another good edge-sharpness measure. In FIG. 26, the endpoints of the span of $W_{edge}$ are a pair of a nearest minimum and a nearest maximum that flanks the peak gradient $g_{peak}$. Alternatively, the endpoints of the span of $W_{edge}$ may be where interpolated gradients cross a fraction of the peak gradient $g_{peak}$. Still alternatively, the endpoints may be where gradients (e.g. difference between adjacent image samples) or interpolated gradients cross a fixed threshold irrespectively of the peak gradient $g_{peak}$. The edge contrast $C_{edge}$ may be taken as a difference in (interpolated) image data samples between these alternative pair of endpoints. The contrasts $C_1$ and/or $C_2$ may be defined as a predetermined portion of the edge contrast $C_{edge}$. Alternatively, any one of them may be defined to be a predetermined multiple of a peak gradient of the edge, such as the peak gradient $g_{peak}$. It is also noted here that the "undivided portion" may be delimited by interpolated samples of image data, such as shown in squares in FIG. 26, or by rounding down or up to a nearest pixel count. Where the undivided portion is delimited by integer pixel positions (e.g. pixels at positions 2 and 5 for contrast $C_2$ in FIG. 26), the undivided portion is a contiguous sequence of pixels such that a contrast, i.e. a difference between (interpolated) samples of image data, between its end pixels is less than the prescribed contrast threshold (e.g. $C_2$ in FIG. 26) and that adding one more pixel to either end will make the contrast between the newly added pixel and the pixel at the other end of the portion exceed the prescribed contrast threshold. Where the undivided portion is permitted to be delimited by interpolated sample(s), more precise width of the undivided portion may be estimated by interpolating image-data sample(s) such that the additional incremental contrast(s) (beyond that between the original samples at integer pixel positions) obtained by such interpolation makes the contrast of the undivided portion come within a predetermined tolerance of the target contrast value $C_1$ (or $C_2$). Furthermore, as an alternative, as shown in FIG. 31A, $C_{edge}$ may instead be measured from a nearest local minimum of image sample to a nearest local maximum of image sample from opposite ends of the edge. Still further alternatively, as shown in FIG. 31B, $C_{edge}$ may instead be measured from across an undivided portion of the span of $W_{edge}$ that is shrunken from the endpoints of the span by a predetermined distance d (e.g. 0.5 $W_{edge}$).

In general, the edge-sharpness measure may be determined by measuring a distance between a pair of positions defined with respect to (interpolated) samples of an image signal. The pair of positions may be any pair of the aforementioned endpoints determined from contrast of the image sample sequence, from gradients, or from second derivatives. Alternatively, one of the positions may be a midpoint (such as anyone described above) between another pair of endpoints instead.

Edge Qualification

Figure 23A:
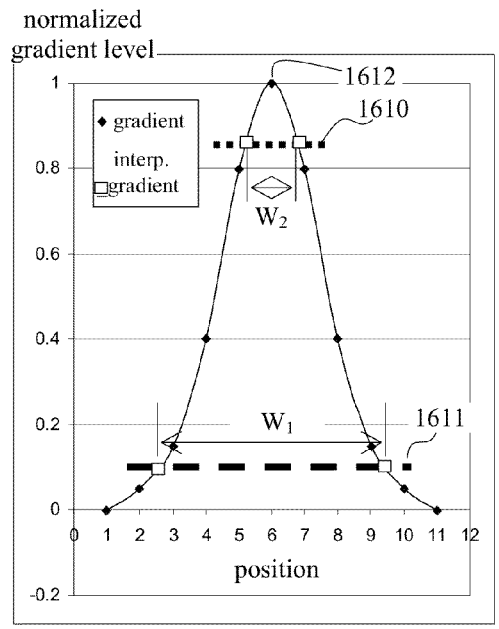
FIG. 23A illustrates a symmetrical sequence of gradients of an image signal across a good edge plotted against distance in multiples of a spacing between successive gradients, and two widths measured for two pairs of interpolated gradients, each pair at a different gradient level.
Figure 23B:
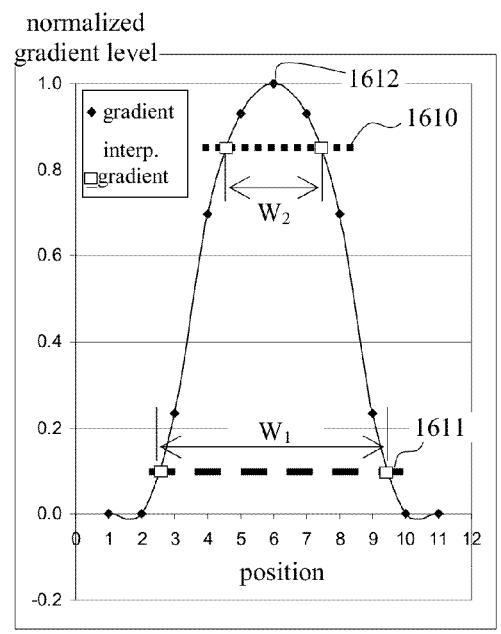
FIG. 23B illustrates another symmetrical sequence of gradients of an image signal across a spurious edge plotted against distance in multiples of a spacing between successive gradients, and two widths measured for two pairs of interpolated gradients, each pair at a different gradient level, ratio of the smaller width to the larger width being nearly double of that shown in FIG. 23A.

FIGS. 23A and 23B show a pair of symmetrical sequences of gradients of the image signal across two different edges, plotted against distance in multiples of a spacing between successive gradients, where the gradient values have been divided (i.e. normalized) by the respective peak gradient values. In each figure, two widths (an upper width $W_2$ and a lower width $W_1$) are indicated for two pairs of interpolated gradients, each pair at a different gradient level 210 or 211.

The lower width $W_1$ may be taken to be the edge width $W_{edge}$ of the respective edges represented by the sequences.

It is clear that, while the lower widths $W_1$ of the two sequences of gradients are equal, i.e. the edge widths $W_{edge}$ are same, the upper width $W_2$ of FIG. 23B is nearly double the upper width $W_2$ of FIG. 23A. Not both of them can represent valid edges for use in generating a reliable focus signal. Considering FIG. 23B being drawn to scale, the sequence of gradients that it displays clearly does not possess a right shape for a normalized gradient profile (i.e. a sequence of gradients of the image signal across the edge divided by either a peak gradient value or an interpolated peak gradient value) of a "good edge" for use to assess sharpness of focus. This inventor recognizes a need to distinguish bad shape from good shape in the normalized gradient profile.

It is also recognized by this inventor that a mere single measurement made from samples of image data at and around the edge is insufficient to distinguish a spurious edge from a good edge. For example, a good edge and a spurious edge may have the same width (measured in any of the known manners) (or edge-sharpness measure) and the same peak gradient value but differ in shapes of their normalized gradient profiles. The spurious edge may even have perfect reflection symmetry in a gradient profile across itself, like FIG. 23B. This inventor recognizes that at least two mutually independent variable quantities can be computed from a normalized gradient profile (of the edge) alone. The normalized gradient profile alone controls (i.e. determines) the quantities in the sense that the normalized gradient profile is sufficient to determine the values for the quantities, i.e. no further information from the image is required. For example, one quantity may be $W_1$ like in FIGS. 23A and 23B and another quantity may be $W_2$. Clearly, given the normalized gradient profile, no other image data or variables computed therefrom can affect $W_1$. Together, these quantities can be used to distinguish between different shapes of normalized gradient profiles.

For good edges, the shape of the normalized gradient profile is not arbitrary, and thus there cannot be arbitrary combinations of values for the at least two quantities. In other words, the range of values a quantity can take for a good edge is constrained by values taken by the rests of the at least two quantities. If values for the at least two quantities are outside of a zone for which good edges are possible, then the edge is likely spurious and should either not be used for generating the focus signal or have its contribution deemphasized.

To detect differences between shapes of the normalized gradient profile, this invention uses an n-tuple of values of n (n≥2, viz., at least two) mutually independent quantities to identify each edge. The edge width itself (or more generally the edge-sharpness measure) may be one of the at least two quantities. Each quantity varies between different shapes of normalized gradient profiles, and its determination requires no more information from the image than a normalized gradient profile of the edge. Thus, a priori known good shapes are identified by the n-tuples of values from a "good" zone that consists of n-tuples that represent "good" shapes. n-tuples of values of the n-tuple of quantities in a "bad" zone outside the "good" zone represent spurious edges. The n-tuples of the "good" zone are assigned relative extent of 1 (i.e. 100%), whereas the n-tuples of the "bad" zone are assigned relative extent of 0 (i.e. 0%). The "bad" zone may be the entire space of n-tuples of the values outside the "good" zone. Alternatively, there can be transition zones between the "good" and "bad" zones in which n-tuples are assigned relative extents intermediate between 1 and 0 such that the relative extent falls gradually from 1 to 0 as a quantity among the n quantities varies while the other ones among the n quantities are fixed.

An edge that receives a relative extent of 0 is not permitted to contribute to the focus signal. A relative extent of 1 allows the edge to contribute fully. A relative extent less than 1 but greater than 0 allows the edge to contribute but with a reduced weight.

The quantities are mutually independent in the sense that any quantity cannot be computed from the other quantities without further involving at least one sample of image data from a predetermined neighborhood of the edge consisting of pixels whose image data are used to compute a gradient profile across the edge. Different edges have different neighborhood of pixels from which the n different quantities and the edge-sharpness measure of the respective one of the different edges are computed.

The EDWM unit implements such a method to qualify edges for participation in generating the focus signal by computing the relative extent. The relative extent is assigned a value according to a shape of a normalized gradient profile of the edge. Each one of the n different shape measures is variable across different shapes. The n different shape measures are mutually independent. The relative extent is based on n (n≥2; viz. at least two) quantities (hereinafter "shape measures") Determination of each one of the shape measures requires no more information from the image other than a sequence of gradients across the edge (hereinafter "gradient profile") divided (i.e. normalized) by a peak gradient of the sequence (hereinafter "normalized gradient profile"). In other words, the normalized gradient profile is all that one needs to know about the image data in order to calculate the shape measures for the edge. Each of the shape measures can vary from a normalized gradient to another normalized gradient profile, especially one that has a different value of the edge width, e.g. 50% wider. If the n-tuple of values of the n shape measures fall outside a predetermined zone, a lesser relative extent is assigned to the edge than if the n-tuple is inside the predetermined zone. Where the focus signal is computed as a weighted average across the edge-sharpness measures of all edges that are allowed to contribute, weights $u_i$ (i=1 to m, m being the total number of edges) having been already determined through other methods (such as the length filter described in the next section), the weight of the edge may be further reduced as compared with other edges by multiplying the weights by the relative extents $X_i$ to form new weights $v_i = X_i u_i$. Thus the new weighted average is $S = \Sigma X_i u_i \sigma_i / \Sigma X_i u_i$, where $\sigma_i$ are the edge sharpness measures of the edges (e.g. edge width $W_{edge}$).

All of the at least two shape measures may be evaluated.

Alternatively, one of the at least two shape measures is not evaluated but instead all variables necessary for its determination are evaluated and one of the variables is compared with a threshold that is a function of the other variables and the other shape measures. An example is where the at least two shape measures are a first shape measure ($C_1/C_0$) and a second shape measure ($W_{edge}$). The first shape measure is a ratio of a contrast $C_1$ over a predefined portion. In this example, this predefined portion is required to have a predetermined width. The predetermined width can be a given number. Alternatively, it can be defined with respect to one of the other shape measures or the edge-sharpness measure. For example, it can be defined as $W_{edge}/2$, i.e. a half of an edge width. The predefined portion can be defined in other manner, as will be described later. The edge contrast $C_0$ is a difference in an image signal between a pair of nearest minimum and maximum that flanks the edge (see FIG. 26). The portion contrast $C_1$ over the portion is a difference in the image signal between two ends of the portion if the portion is an undivided portion (as shown in FIG. 26). (The case where several undivided portions together constitute the portion is discussed later). The second shape measure is a width $W_{edge}$ between two equal but opposite-signed gradients that are a given fraction of a peak gradient (see $W_1$ of FIGS. 23A, B for example). The portion contrast $C_1$ (a first variable) may be evaluated and compared with the edge contrast $C_0$ (a second variable) across the edge, which is also evaluated, multiplied by a threshold that is a decreasing function $F(W_{edge})$ of the width $W_{edge}$, which is also evaluated. There can be a pair of such thresholds flanking an expected value of the contrast ratio $C_1/C_0$ as a function of $W_{edge}$. Such comparison on the first shape measure may be called an indirect comparison since it does not directly compare the first shape measure against a criterion set up by the other shape measures but does so in an different way to obtain same result. The relative extent is decreased if the portion contrast $C_1$ is lesser (or greater). The decrease may be abrupt, e.g. a drop from 1 (i.e. 100%) to 0. Alternatively, it may be gradual, e.g. a constant rate of decrease, or in a shape of a sigmoid function.

As will be shown below, this contrast ratio $C_1/C_0$ requires no more information from the image than a sequence of normalized gradients to be determined and therefore is a shape measure. The difference between any two image data samples from a sequence of pixel image sample values $s_1$, $s_2$, ..., $s_{n-1}$, and $s_n$ is $s_j - s_k = (s_j - s_{j-1}) + (s_{j-1} - s_{j-2}) + ... + (s_{k+1} - s_k)$, where j>k, and each term in the sum is a gradient from a Roberts edge detector operating on the sequence of pixel data samples across the edge. A difference between an interpolated image data sample between $s_{i+1}$ and $s_j$ and another interpolated image data sample between $s_k$ and $s_{k-1}$ is equal to a result from an interpolation between a sum of contiguous gradients just between the positions of the interpolated image data samples, viz. $(s_j - s_{j-1}) + (s_{j-1} - s_{j-2}) + ... + (s_{k+1} - s_k)$, and a sum of contiguous gradients that just contains the positions, viz. $(s_{j+1} - s_j) + (s_j - s_{j-1}) + ... + (s_{k+1} - s_k) + (s_k - s_{k-1})$. The contrast ratio $C_1/C_0$ is a ratio between two such differences across the respective ends of two different portions of the edge and is therefore a ratio of (interpolated) sums of gradients, and finally a ratio of (interpolated) sums of normalized gradients since both numerator and denominator are divided by the same peak gradient value. As a result, the contrast ratio $C_1/C_0$ is determined by a normalized gradient profile across the edge and therefore is a shape measure.

In the above example, the portion is defined in a predetermined manner with respect to the edge. For example, it may be defined to be an undivided portion centered at a peak gradient of the edge, or centered at a midway of transition of the image signal between the pair of a nearest minimum and a nearest maximum or between two endpoints where the gradient profile just exceeds a fixed threshold irrespective of the peak gradient or between two endpoints where interpolated gradients are equal to a given fraction of the peak gradient (or interpolated peak gradient), or centered at a midpoint between two gradients that have equal magnitude but that are on opposite sides of the peak gradient. Alternatively, the portion may be entirely on one side of the peak gradient (or interpolated peak gradient only). For example, the portion may have one endpoint on the peak gradient (or interpolated peak gradient) or the midway of transition or the midpoint between equal gradients (or interpolated gradients).

Although the example shown in FIG. 26 shows $C_1$ over an undivided portion of width $W_1$, the portion may be constituted by several undivided portions, each of them being predefined differently in any one of the manners. In this case, the portion contrast $C_1$ over the portion and the portion width $W_1$ are a sum of contrasts across the individual undivided portions and a sum of widths of these undivided portions. For example, the portion may be constituted by two separate undivided portions, each occupying a different outer third of a span between endpoints of the edge. The endpoints of the edge may be detected in any one of the known methods to determine an edge span, a few of which are described below.

In the above example, the edge contrast $C_0$ may be measured between other endpoints other than the pair of a nearest minimum and a nearest maximum that flanks the peak gradient. It may instead be measured between two positions where the gradient just exceeds a fixed threshold irrespective of the peak gradient. In this case, instead of a fixed threshold, a threshold that is directly proportional to the peak gradient may be used.

In the above example, portion contrast $C_2$ of another predefined portion (see FIG. 26) may be used instead of edge contrast $C_0$. This other predefined portion, though shown as an undivided portion in FIG. 26, may be constituted by several predefined undivided portions. Like in the case of $C_1$ and $W_1$, $C_2$ and $W_2$ may be a sum of contrasts across these individual undivided portions and a sum of the widths of these individual predefined undivided portions, respectively.

In the above example, the predefined portion may be predefined in other way than by the widths $W_1$, $W_2$ of the respective portions. For example, the predefined portion may be specified as a portion within which gradients are at or above a half (or a third, or some other fraction) of the peak gradient value or interpolated peak gradient value. Alternatively, it may be specified by the second derivative. For example, the endpoints of the portion may be specified as where the (interpolated) peaks of the second derivatives are.

Alternatively, two or more of the n shape measures are not evaluated but nonetheless the relative extent has a unique value for each n-tuple of values of the n shape measures. This occurs where the relative extent is expressed as a mathematical expression in which variables from the two or more of the n shape measures mutually cancel arithmetically. Take for example FIG. 24B described in the earlier section on the edge-sharpness measure. Aside from the unnormalized area $A_3$ under the unnormalized gradient profile and above the unnormalized gradient level $L_2$, another unnormalized area $A_4$ may be calculated by selecting a lower unnormalized gradient level $L_3$ ($L_3<L_2$) that is a different given fraction of the peak gradient value $L_p$. The relative extent may then be a function of the ratio $A_3/A_4$. But the area ratio $A_3/A_4 = (A_3/L_p^2)/(A_4/L_p^2)$ and each of the numerator $A_3/L_p^2$ and denominator $A_4/L_p^2$ is simply an area under the gradient profile normalized by the peak gradient $L_p$. Therefore, the area ratio $A_3/A_4$ is determined by the normalized gradient profile.

Back to the case where the first shape measure is evaluated, with respect to the immediate above example illustrated by FIG. 26, the contrast ratio $C_1/C_0$ is compared with the first threshold $F(W_{edge})$. Such comparison may be called a direct comparison on the first shape measure. Like the indirect comparison, the relative extent is decreased if $C_1/C_0$ is lesser (or greater). The transition may be either abrupt or gradual.

In the examples illustrated by FIGS. 23A and 23B, the relative extent may be a bell-shaped function of a ratio $W_2/W_1$ of the upper width $W_1$ to the lower width $W_2$. These widths are the first and second shape measures. The bell-shaped function may peak at a particular value $\alpha$ of this ratio $W_2/W_1$ and have value of 1 at this peak. This bell-shaped function expresses an expectation that the ratio $W_2/W_1$ be centered at the particular value $\alpha$; that, given $W_1$, $W_2$'s expected value is $\alpha W_2$ and, given $W_2$, $W_1$'s is $W_2/\alpha$; and that the further the ratio $W_2/W_1$ departs from the particular value $\alpha$ the lesser the relative extent becomes.

The relative extent may be defined by a plurality of contours in a multidimensional scatter plot for which points are m-tuples of the values of m variables and each contour is a set of points that share same relative extent. An example is a scatter plot of a first variable (e.g. $C_1/C_0$ of FIG. 26) against a second variable (e.g. $W_{edge}$). The first variable may be $C_1$ instead, and the second variable be $C_0 \cdot F(W_{edge})$, where $F(W_{edge})$ is a function of $W_{edge}$ that expresses a target value for $C_1/C_0$ given $W_{edge}$. The relative extent may look up in a lookup table in the memory using the variables. The variables may consist of the n shape measures. Alternatively, they may be a set of variables that together determines the n shape measures.

In another way to compute the relative extent, the EDWM unit may evaluate one of the variables against a criterion that depends on the other variables. For example, the criterion may require that one of the variables be within a predetermined tolerance of an expected value, which is a function of the other variable(s). Alternatively, instead of the expected value and the tolerance separately, a pair of thresholds may be determined as a function of the other variables. If the one variable lies outside an acceptance range defined by the expected value and the tolerance or demarcated by the pair of thresholds then the relative extent is reduced. The relative extent varies between one value (e.g. one) for satisfying the criterion to another value for not satisfying the criterion (e.g. zero). It can have either an abrupt transition or a smooth transition with respect to variation of the difference between the actual value of the one variable and its expected value (or across a threshold). The relative extent preferably varies like a sigmoid function with respect to magnitude of the difference. Either direct or indirect comparisons may be used, namely the one variable may be a shape measure or be one variable among the set of variables that together define/determine the n mutually independent shape measures.

Figure 28:
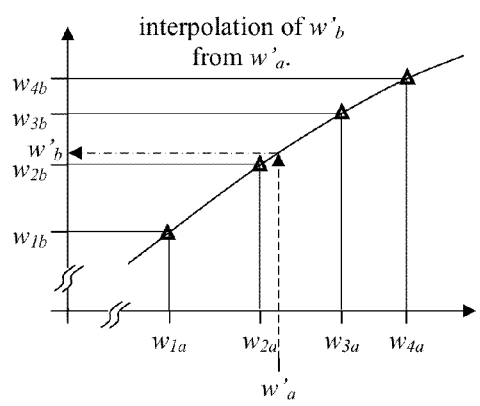
FIG. 28 shows a scatter plot of four pairs of expected values of first and second shape measures $(w_{1b}, w_{1a})$, $(w_{2b}, w_{2a})$, $(w_{3b}, w_{3a})$, $(W_{4b}, w_{4a})$, and illustrates a value $w'_b$ for the first shape measure is found by interpolation from a value $w'_a$ for the second shape measure.
Figure 29:
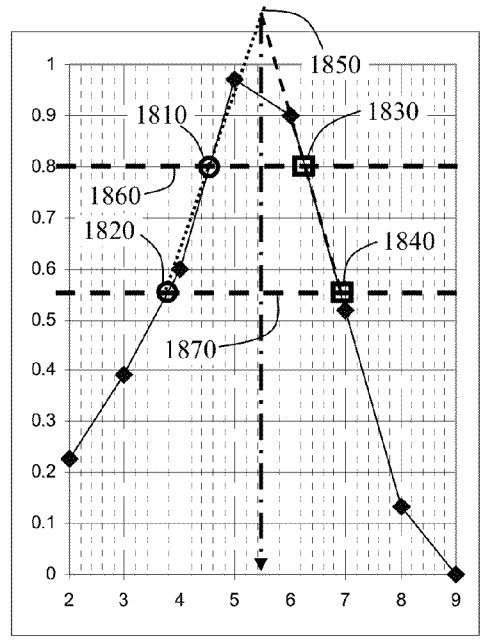
FIG. 29 illustrates finding an interpolated peak's position by interpolation.

Any of the functions used to define and/or compute the relative extent, including threshold or any other quantified values that specify the criterion, may be expressed in a mathematical formula (e) recorded in a computer-readable medium, such as a non-volatile memory (for example flash memory), and used by the EDWM unit for execution. Alternatively, a lookup table stored in the computer-readable medium can be used. FIG. 28 shows a scatter plot of four pairs of values of first and second variables ($w_{1b}$, $w_{1a}$), ($w_{2b}$, $w_{2a}$), ($w_{3b}$, $w_{3a}$), ($w_{4b}$, $w_{4a}$), and illustrates that a value $w'_b$ for the first variable is found by interpolation from a value $w'_a$ for the second variable. The lookup table may store pairs of values of the first and second variables and the EDWN unit may retrieve pairs for interpolation to find expected value (or thresholds) of one variable given value(s) of the other variable(s). In general, the lookup table can define values of a function of m variables at a plurality of m-tuples of values of the m variables.

Depending on the choice of the n shape measures, the method may or may not detect an extent to which a sequence of gradients across the edge lacks perfect reflection symmetry. For example, as described in the paragraph immediately under the present heading with reference to FIGS. 23A and 23B, which each plots a perfectly symmetrical sequence of gradients of an edge, the normalized gradient profiles can be distinguished, i.e. assigned different values for their respective relative extents, on basis of widths measured at different normalized gradient levels. It will be clear from further examples later in this section that there are further choices of the n shape measures that can discriminate against an edge that has a bad gradient profile that has perfect reflection symmetry.

Figure 27A:
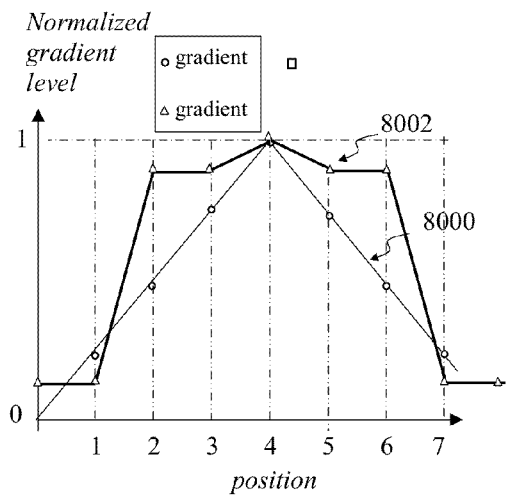
FIG. 27A illustrates two symmetrical sequences of gradients plotted against distance in multiples of a spacing between successive samples of each sequence, the sequences normalized with respect to their respect peak gradients, where the plot for one sequence has a triangular shape and the plot for the other sequence has a shape of a hat.
Figure 27B:
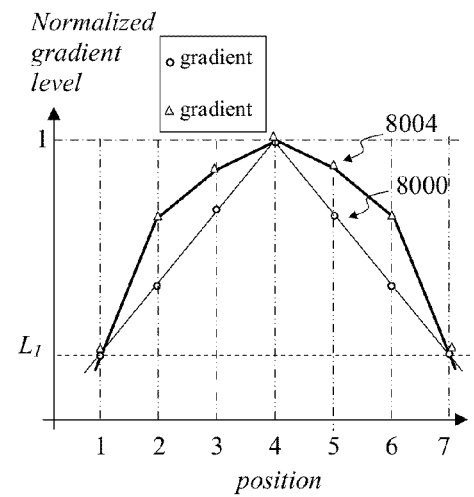
FIG. 27B illustrates two symmetrical sequences of gradients plotted against distance in multiples of a spacing between successive samples of each sequence, the sequences normalized with respect to their respect peak gradients, where the plot for one sequence has a triangular shape down to a normalized gradient level and the plot for the other sequence has a shape of a dome.

More specifically, there is a sequence of gradients having perfect reflection symmetry such that if an edge has the sequence of gradients across itself then its relative extent will be reduced. As an example, such a sequence may be {0.1, 0.15, 0.2, 0.9, 0.9, 1, 0.9, 0.9, 0.2, 0.15, 0.1}. As another example, such sequence may be {0, 0.2, 0.2, 0.7, 0.7, 1, 0.7, 0.7, 0.2, 0.2, 0}, which is sequence 8002 shown in FIG. 27A in a shape of a hat. As a third example, such a sequence may be {0, 0.25, 0.5, 0.75, 1, 0.75, 0.5, 0.25, 0}, which is shown as sequence 8000 in FIG. 27B in a shape of a isosceles triangle.

One of the shape measures may be the edge-sharpness measure, though this is not necessary. In the examples of FIGS. 23A and 23B, the lower width $W_1$ may be the edge-sharpness measure used to calculate the focus signal, both the lower width $W_1$ and the upper width $W_2$ may be all the shape measures.

Where the edge-sharpness measure is not one of the shape measures and the edge is disqualified (i.e. omitted) from contributing to the focus signal, computing of the edge-sharpness measure for the edge may be omitted.

Preferably, a shape measure is not computed from one positive gradient and one negative gradient for every edge for which the shape measure is computed. For most edges, finding a normalized interpolated gradient on the edges does not require interpolating between a positive gradient and a negative gradient.

Evaluating a shape measure for an edge does not depend upon detection of another edge either. A shape measure, which is determined by the normalized gradients across the edge, is not affected by detection or not of the other edges once the normalized gradients are fixed since the normalized gradient profile provides all the information that there is available from the image to determine the shape measure.

Preferably, the shape measure changes by less than 10%, more preferably less 5%, if the illumination on the scene falls by 20%. Such is especially where all pixel values involved in computing the shape measure are within lower half of the pixel value range of the image, i.e. the dynamic range, so that response of the normalized gradient is less than linear because the pixel data from which the gradients are determined respond nearly linearly to changes in the illumination.

Preferably, a shape measure is not chosen to measure an edge unless a 20% fall in the illumination on the scene does not result in a difference between whether the edge is omitted or allowed to contribute to the focus signal. Alternatively, a shape measure is preferably not chosen to measure an edge unless a 20% fall in the image signal values that contribute towards the shape measure for the edge causes less than 10% change in the shape measure, particularly for edges whose pixel values used to compute the shape measure are within lower half of a dynamic range of the image, and more preferably less than 5%.

In general, any of the methods described under the heading "Edge-sharpness measures" or meeting the requirements of the edge-sharpness measure can be used to create one or more shape measures, as long as all shape measures are mutually independent in the aforementioned sense. For example, with reference to FIG. 23B, a first shape measure may be the width $W_2$ between two interpolated gradients at the upper normalized gradient level 3310 and a second shape measure the width $W_1$ measured between a pair of interpolated gradients at the lower gradient level 3312. The second shape measure may also be used as the edge-sharpness measure for the edge of this example. Alternatively, the edge-sharpness measure may be measured at a third normalized gradient level different from the upper 3310 and lower 3312 normalized gradient levels.

Still alternatively, either the second shape measure or the edge-sharpness measure or both may be measured using another shape measure method. An example for the other shape measure is a function of distances (e.g. $u_2$ to $u_6$ in FIG. 24D) of the gradients over the edge from a predefined position (e.g. a center of gravity 3401 of FIG. 24D). It is clear that normalizing the gradient profile does not change the position of the center of gravity.

A second moment of the distances is one example of such function of distances of the gradients. Given gradients $g_1$, $g_2$, ..., $g_k$, and their distances $u_1, u_2, \ldots, u_k$ from the center of gravity, the second moment of the distance is $(g_2 u_2^2 + g_2 u_2^2 + \ldots + g_k u_k^2)/(g_1 + g_2 + \ldots + g_k)$. Normalizing the gradients clearly does not change the value of the second moment. Hence, the second moment of the distances is determined by the normalized gradient profile, and therefore is good for a shape measure.

Another example is a distance $W_1$ between an outer pair of second derivatives interpolated to a predetermined magnitude that is a predetermined fraction of a peak gradient of the edge from a sequence of second derivatives arrayed across the edge (see FIG. 25). Given a normalized gradient profile of the edge, the second derivatives are determined to within a factor of the peak gradient value, i.e. the sequence of second derivatives is directly proportional to the peak gradient value. Since the predetermined magnitude is also directly proportional to the peak gradient value, where the second derivatives are equal to the predetermined magnitude does not change when the peak gradient value varies. Thus, the distance $W_1$ is determined by the normalized gradient profile.

Still another example is a distance $W_s$ between the positive and negative peaks (or interpolated peaks) of the second derivatives, or a distance between a zero-crossing between the peaks to one of the peaks or to a second derivative having a predetermined magnitude. The second derivatives are determined by a gradient profile in the sense that given the gradient profile the second derivatives can be calculated without further information. The locations of the peaks and the zero-crossing do not change whether or not the gradient profile is normalized. In other word, the gradient profile normalized by its peak gradient determines the locations of the peaks and the zero-crossing, hence the distances between any two of them, making these distances good for shape measures.

Furthermore, with reference to FIG. 26, a width $W_1$ between two ends of an undivided portion (of the edge) that has a predefined contrast $C_1$ (i.e. difference in an image signal value) between its two ends can be used as a shape measure and/or edge-sharpness measure. The portion contrast $C_1$ may be defined as a given fraction of the edge contrast $C_0$. The edge contrast $C_0$ is a difference in image sample values between a nearest pair of a minimum and a maximum that flanks a peak gradient of the edge. Alternative ways of specifying the edge contrast have been discussed earlier in this section concerning the contrast ration $C_1/C_0$. As will be shown below, this width $W_1$ requires no more information from the image than a sequence of normalized gradients to specify and therefore is a shape measure.

The difference between any two image data samples from a sequence of pixel image sample values $s_1, s_2, \ldots, s_{n-1}$, and $s_n$ is $s_j - s_k = (s_j - s_{j-1}) + (s_{j-s} - s_{j-2}) + \ldots + (s_{k+1} - s_k)$, where j>k, and each term in the sum is a gradient from a Roberts edge detector operating on the sequence of pixel data samples across the edge. A difference between an interpolated image data sample between $s_{j+1}$ and $s_j$ and another interpolated image data sample between $s_k$ and $s_{k-1}$ is then also a result from an interpolation between a sum of contiguous gradients just between the positions of the interpolated image data samples, viz. $(s_j-s_{j-1})+(s_{j-1}-s_{j-2})+\ldots+(s_{k+1}-s_k)$, and a sum of contiguous gradients that just contains the positions, viz. $(s_{j+1}-s_j)+(s_j-s_{j-1})+\ldots+(s_{k+1}-s_k)+(s_k-s_{k-1})$. $C_1/C_0$ is a ratio between two such differences across the respective ends of two different portions of the edge and is therefore a ratio of (interpolated) sums of gradients, and finally a ratio of (interpolated) sums of normalized gradients since both numerator and denominator are divided by the same peak gradient value. As a result, $C_1/C_0$ for the portion of the edge is determined by a normalized gradient profile across the edge. The right portion that has the predetermined value of $C_1/C_0$ and the width $W_1$ of the portion therefore is determined by the normalized gradient profile. Therefore, the width $W_1$ is good for a shape measure.

The undivided portion is defined in a predetermined manner with respect to the edge. For example, it may be defined to be an undivided portion centered at a peak gradient of the edge, or centered at a midway of transition of the image signal between the pair of a nearest minimum and a nearest maximum or between two endpoints where gradient profile just exceeds a fixed threshold irrespective of the peak gradient or between two endpoints where interpolated gradients are equal to a given fraction of the peak gradient (or interpolated peak gradient), or centered at a midpoint between two gradients that have equal magnitude but on opposite sides of the peak gradient. Alternatively, the undivided portion may be entirely on one side of the peak gradient (or interpolated peak gradient only). For example, the undivided portion may have one endpoint coinciding with the peak gradient (or interpolated peak gradient) or with the midway of transition or with the midpoint between equal gradients (or interpolated gradients). Other manners of predefining the portion are possible.

As an alternative to the undivided portion for providing $W_1$ and $C_1$, several separate undivided portions may be used. The portion contrast $C_1$ over the portion is then a sum of the contrasts across the individual undivided portions that constitute the portion, and $W_1$ is a sum of the widths of the individual undivided portions. As an example, $C_1$ may be specified as two thirds of $C_0$, and two undivided portions are used, occupying a top one third and a bottom one third, respectively, of the edge contrast $C_0$. $W_1$ is then a sum of widths of the individual undivided portions, and is equal to the distance between the endpoints between which the image signal is subtracted to obtain the edge contrast $C_0$ minus a width of a middle undivided portion that occupies a middle one third of the edge contrast $C_0$.

In addition to any edge-sharpness measure method, a shape measure can draw on other methods. Further examples are described below.

FIG. 24A illustrates a symmetrical sequence of normalized gradients across an edge plotted against distance in multiples of a spacing between successive gradients, and a normalized gradient value of an interpolated gradient at a predefined distance $D_3$ from a peak gradient. This sequence of normalized gradients has a normalized peak gradient 3212. A width $W_0$ measured at normalized gradient level $L_0$ can be used as a shape measure. The distance $D_3$ may be defined with respect to width $W_0$, for example as a predetermined fraction of the width $W_0$, or with respect to another width of the edge measured from any one of the edge-sharpness measures, for example as a predetermined multiple of a square-root of a variance of the distances of the gradients from a center of gravity of the gradients. At the distance $D_3$, a normalized interpolated gradient value $L_3$ is computed. Alternatively, instead of defining the distance $D_3$ to start from the peak gradient, it may start from a different position. For instance, it may start from a position that splits a contrast across the edge $C_{edge}$ into halves such that a contrast of $\frac{1}{2}C_{edge}$ develops to each side of the position. Or it may start from a position midway between two positions where the sequence of image data samples have same magnitude of gradient or interpolated gradient.

FIG. 24C illustrates a sequence of normalized gradients of an image signal across an edge plotted against distance in multiples of a spacing between successive gradients, and a slope $S_L$ (i.e. normalized second derivative of the image signal) of the plotted sequence of normalized gradients taken at a normalized gradient level 3274 defined with respect to an interpolated peak 3270. The slope $S_L$ is also a good candidate for a shape measure because it is determined by the normalized gradient profile.

A sum of a power of a plurality of normalized gradient values from a sequence of gradients across the edge is also good for a shape measure since it is determined by the normalized gradient profile.

Earlier in this section, it is pointed out that computing the relative extent does not require computing the first and second shape measures directly. Here is another example. The first shape measure may be the interpolated gradient value at a predefined distance from an interpolated peak or a peak gradient of the sequence of gradients, like in FIG. 24A, but not normalized, and the second shape measure may be an area of a region under the sequence of gradients plotted against distance, as shown in FIG. 24B and discussed above but also not normalized. The first shape measure may be squared and divided by the second shape measure to result in a ratio whose unit does not contain a unit of energy. This ratio can then be used to find the relative extent through a predefined function that defines the relative extent as a function of the ratio. Thus, the relative extent is determined by the normalized gradient profile in that its determination requires no further information from the image. In this example, one can substitute an unnormalized interpolated gradient value and an unnormalized area for the normalized interpolated gradient value and the normalized area, respectively. Since normalizing a quantity involves dividing the quantity by the peak gradient, dividing the squared normalized interpolated gradient value and the normalized area results in a square of the peak gradient appearing in both the former and the latter and thus canceling itself out. The ratio can be computed more easily by dividing the square of the unnormalized interpolated gradient by the unnormalized area. Nevertheless, the ratio is still a ratio of the square of the normalized interpolated gradient value to the normalized area, and therefore the relative extent is a function of the normalized interpolated gradient value and the normalized area. As a result, a change in the normalized area results in a change in the relative extent for the same normalized area.

It is noted that, in this disclosure, a quantity from an edge, such as a gradient level, is said to be normalized when it is divided by, by default unless otherwise specified, either a peak gradient value of the edge or gradient value of an interpolated peak. For example, in FIG. 23B, peak gradient 3212 has a normalized value of exactly 1, whereas in FIG. 24C the interpolated peak 3270 is different from the peak gradient 3212, and the gradients shown in FIG. 24C are normalized with respect to the interpolated peak 3270, not the peak gradient 3212.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210, wherein the edges processed by the Length Filter 212 are those that pass through the width filter 209 depending on the 'fine' signal.

In an alternative embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
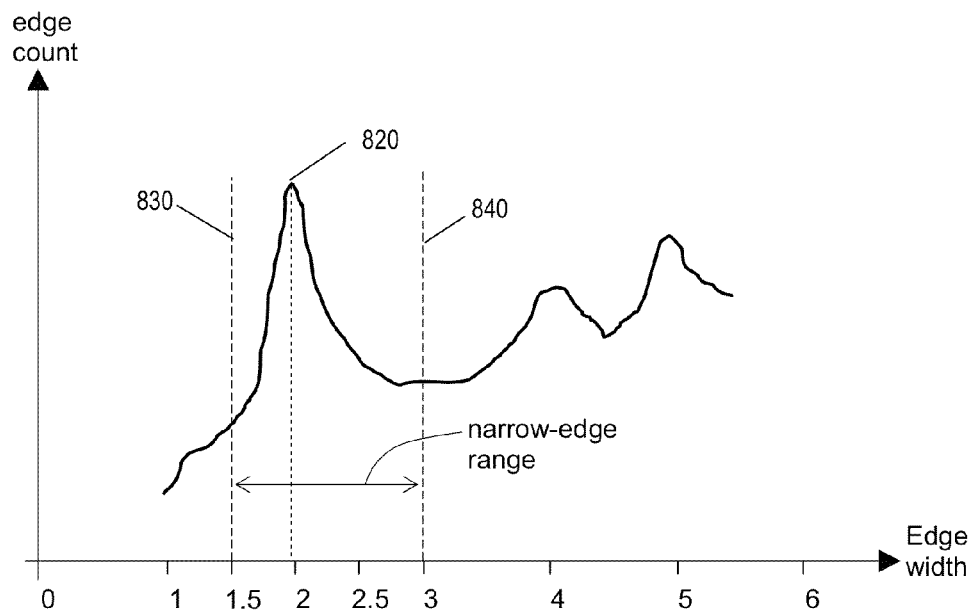
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i = c_i$, $c_i$ being the edge count at edge width $e_i$, i being a bin number of a histogram of edge widths. Alternately, the weight at each edge width may be the edge count for the edge width multiplied by the edge width itself, i.e. $w_i = c_i e_i$. In addition, preferences from the Width Filter 209 that are expressed in terms of weights may be further multiplied to each edge width. For example, for weights $\Omega_i$ produced by the Width Filter 209, $\Sigma \Omega_i = 1$, focus signal may be calculated as $\Sigma \Omega_i w_i e_i / \Sigma \Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
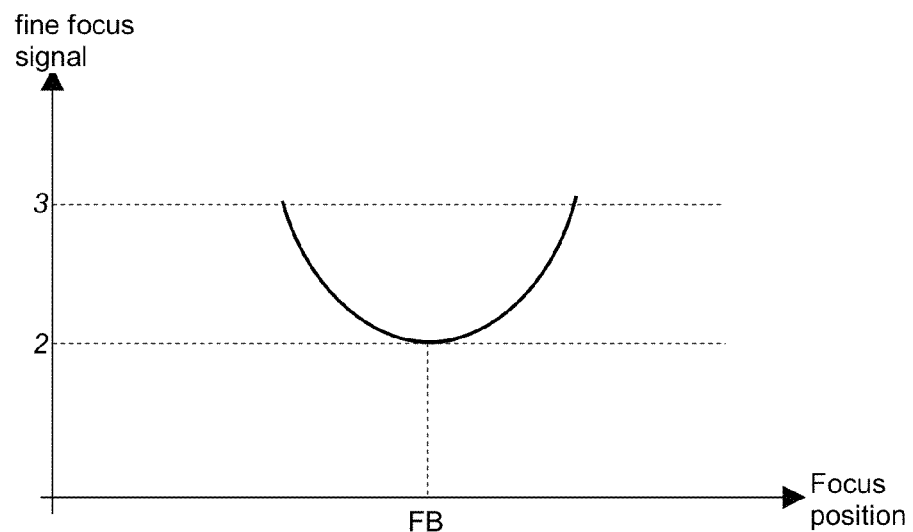
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
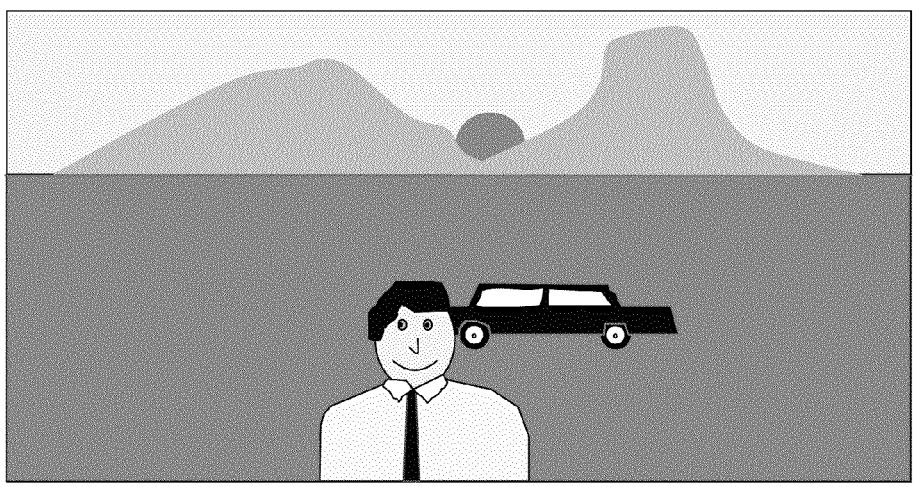
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
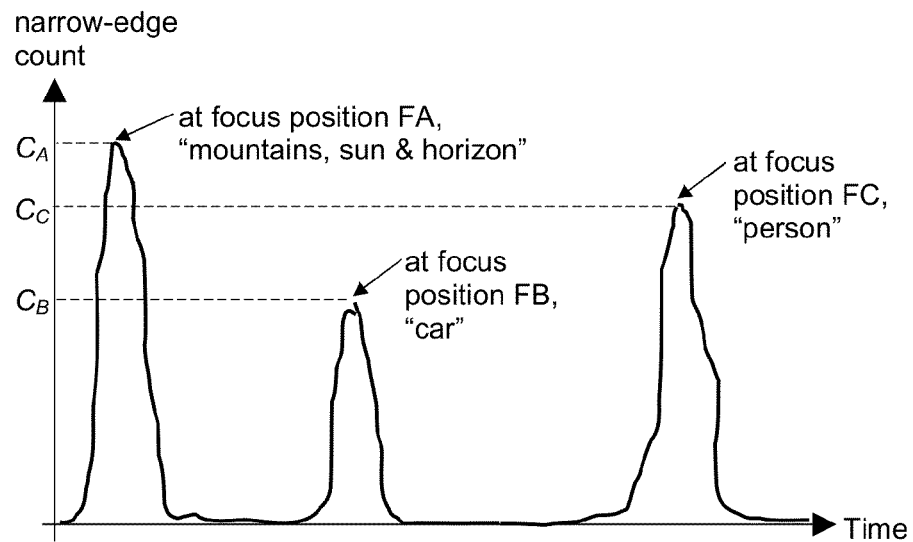
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
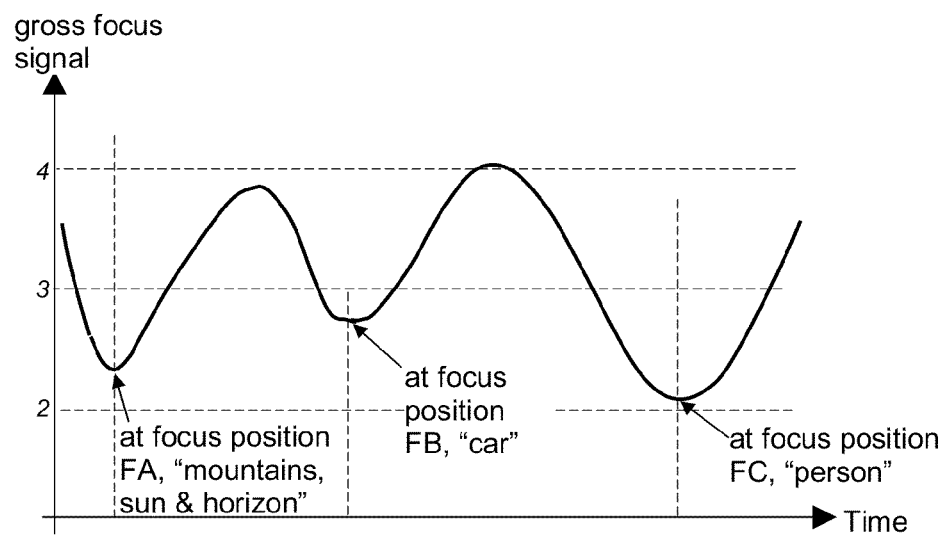
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp_edge_width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp_edge_width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
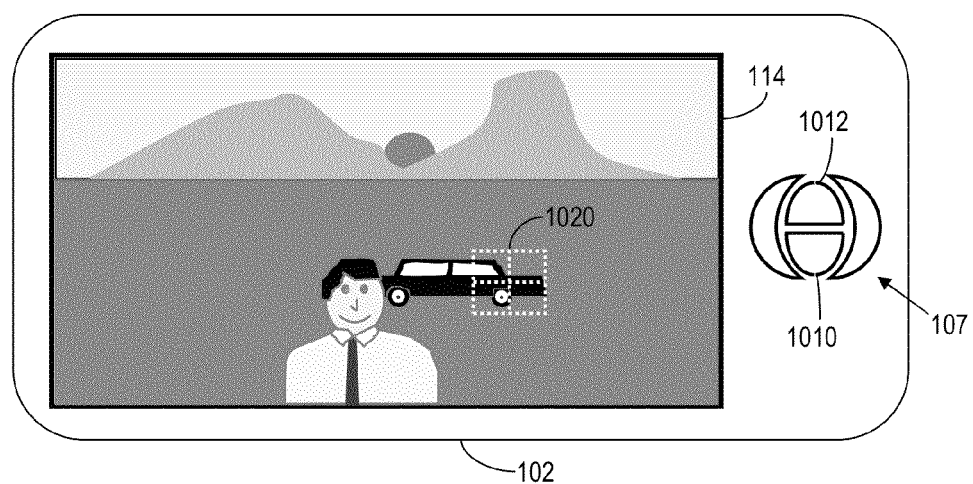
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp_edge_width.

Alternate Embodiments

Figure 17:
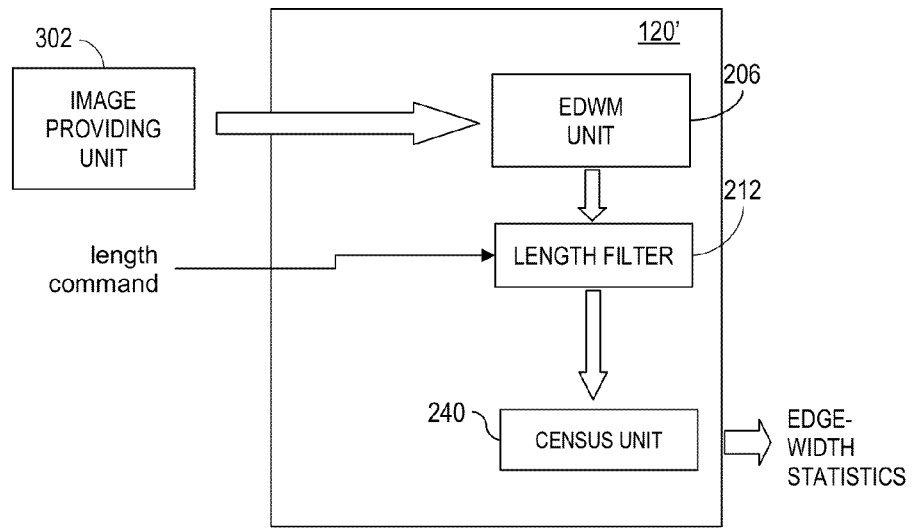
FIG. 17 is a block diagram of an alternate embodiment of a focus signal generator.

FIG. 17 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 18:
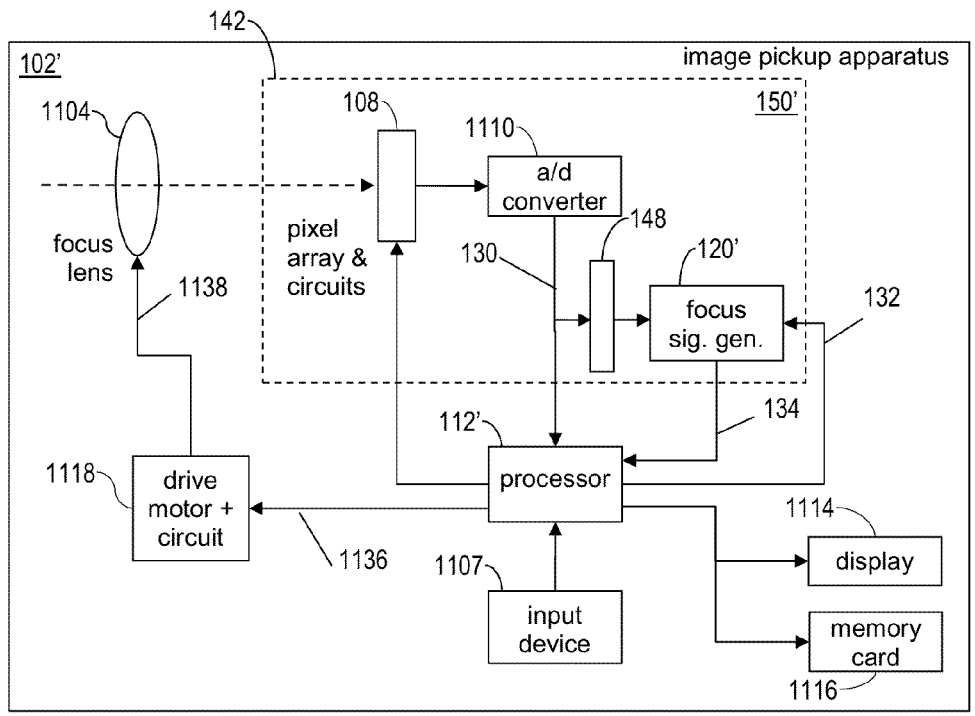
FIG. 18 is a schematic of an alternate embodiment of an auto-focus image pickup apparatus.

Referring to FIG. 18, the edge-width statistics thus provided in signals 134 to an alternative embodiment of processor 112' in an alternative auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Auxiliary Pixel Array

Figure 19:
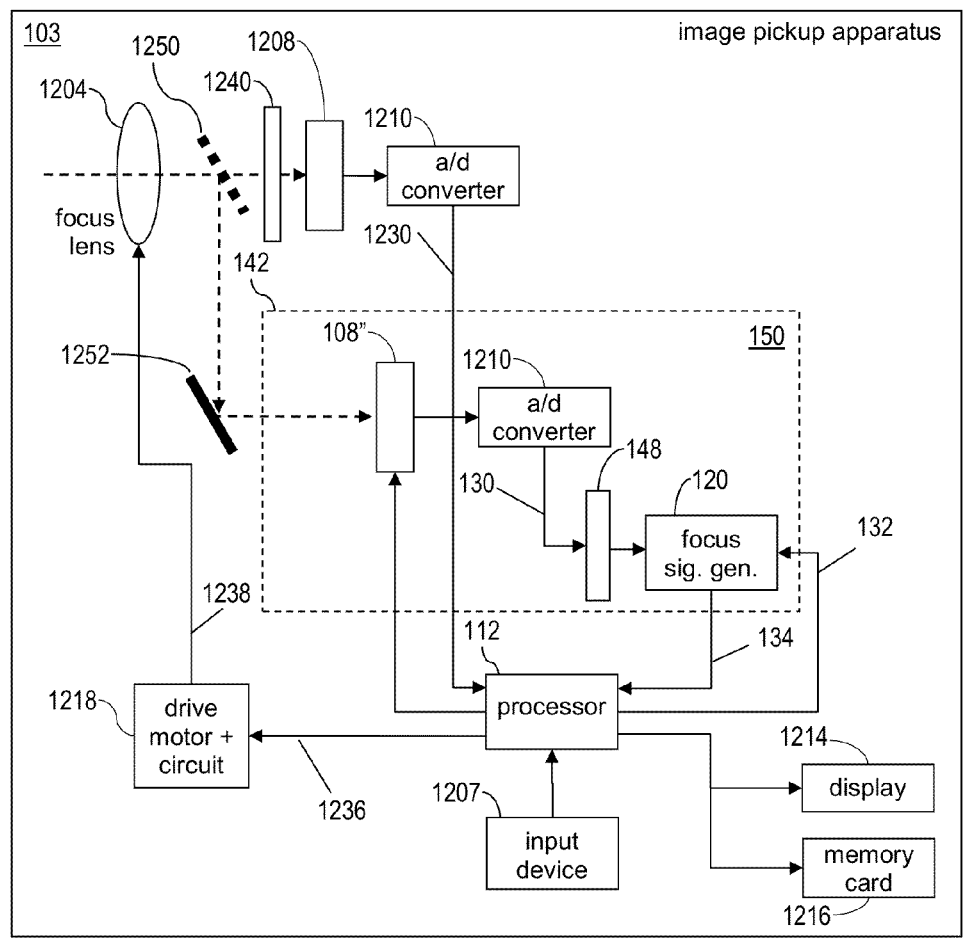
FIG. 19 is a schematic of an embodiment of an auto-focus image pickup apparatus having a main pixel array and an auxiliary pixel array.

FIG. 19 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 22:
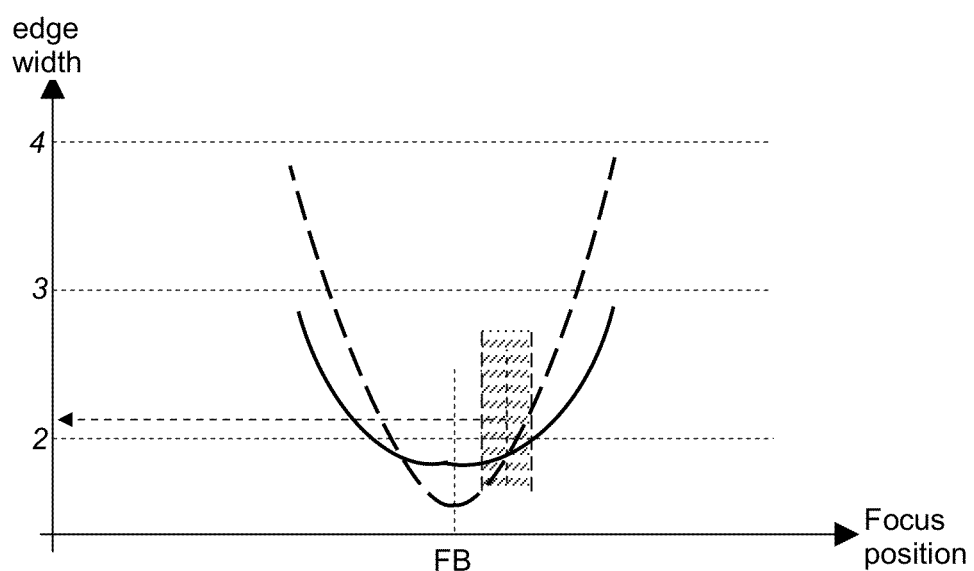
FIG. 22 is an illustration of a variation of an edge width from a main pixel array and a variation of an edge width from an auxiliary pixel array at different focus positions.

FIG. 22 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp_edge_width, since moiré due to aliasing is not as critical in the auxiliary image, as it is not presented to the user as a final image. This helps to sharpen the slope below and above the sharp_edge_width. The sharper slope is also helped by the auxiliary pixel width being smaller than the main pixel width.

The shaded region in FIG. 22 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 20:
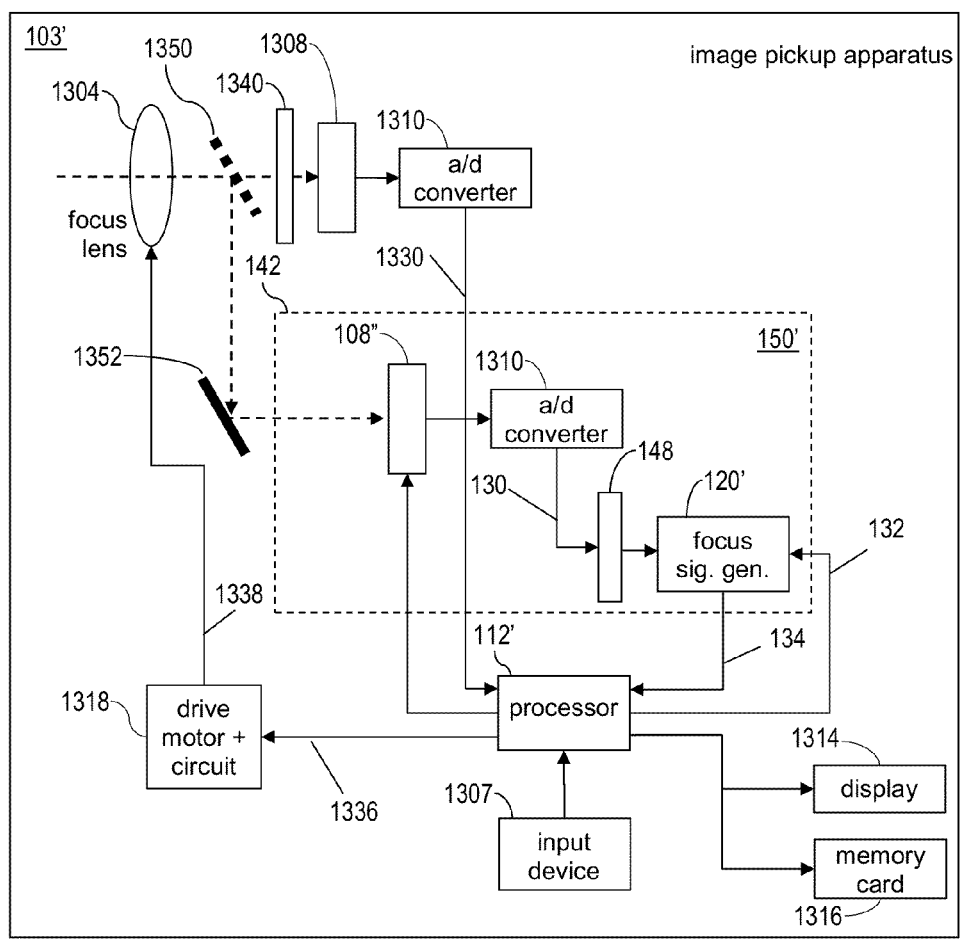
FIG. 20 is a schematic of an alternate embodiment of an auto-focus image pickup apparatus having a main pixel array and an auxiliary pixel array.

FIG. 20 shows an alternative embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 21:
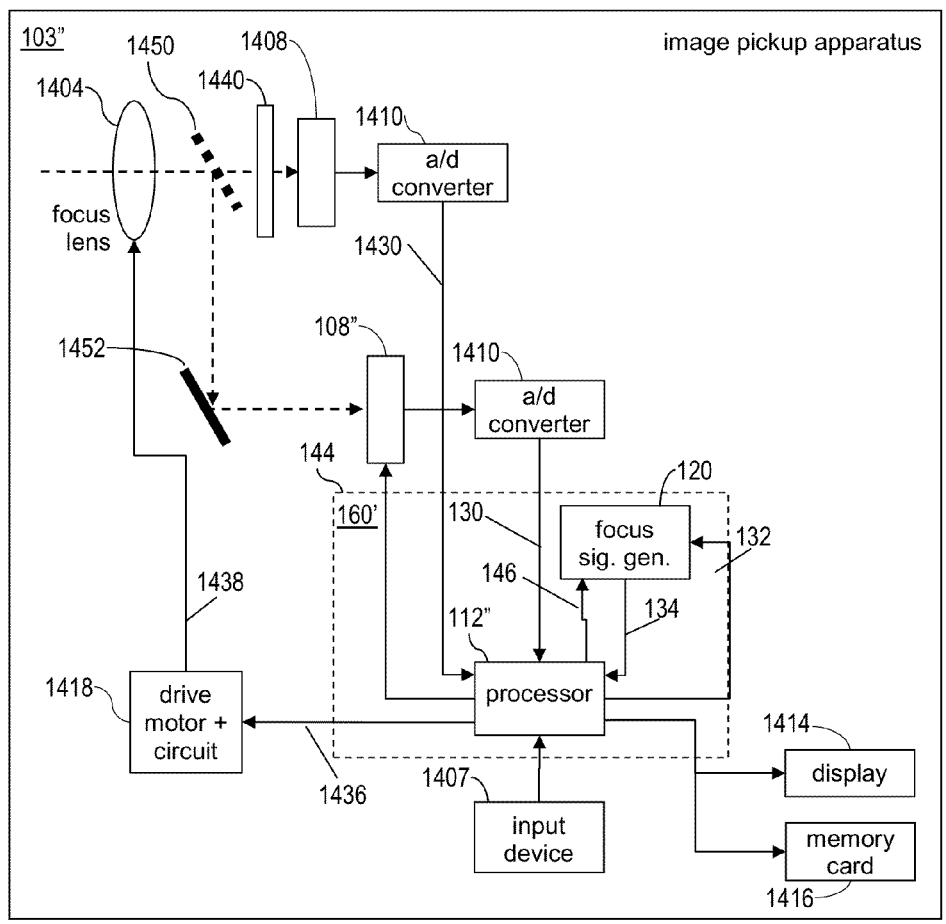
FIG. 21 is a schematic of an alternate embodiment of an auto-focus image pickup apparatus having a main pixel array and an auxiliary pixel array.

FIG. 21 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

Figure 30:
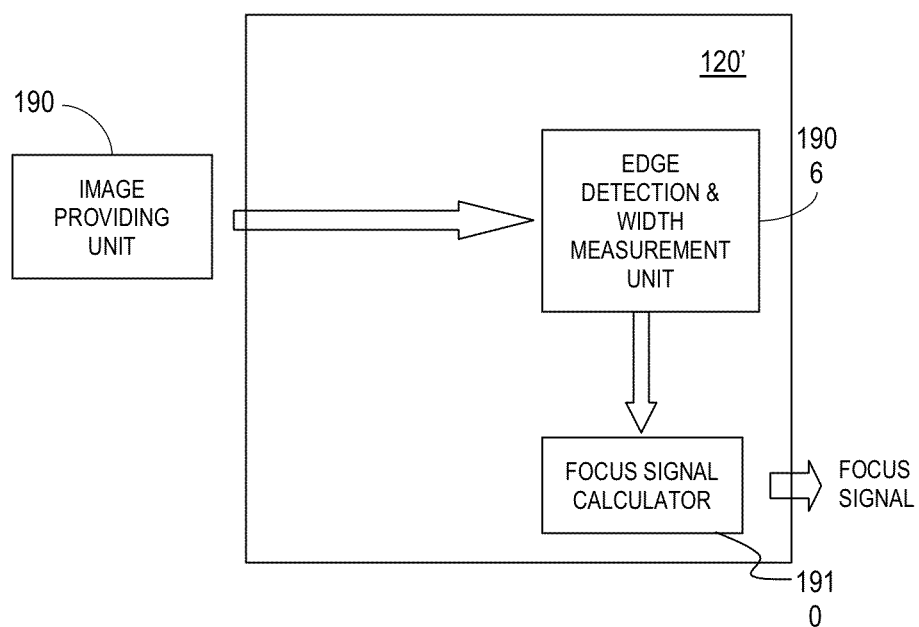
FIG. 30 shows an alternate embodiment of a focus signal generator.

FIG. 30 shows yet another embodiment of focus signal generator 120'. This embodiment may be employed in any of the above image capture systems.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A method for generating a focus signal from a plurality of edges of an image of a scene to indicate a degree of image sharpness, comprising:
   determining a relative extent to which an edge will weigh in contributing to the focus signal as compared with other edges that contribute to the focus signal,
   wherein the relative extent is assigned a value at least according to a shape of a normalized gradient profile of the edge, the shape being identified by an n-tuple of values of n different shape measures (n≥2), each one of the n different shape measures being variable across normalized gradient profiles of different shapes, the n different shape measures being mutually independent, determination of each one of the n different shape measures requiring no more information than a normalized gradient profile of the edge,
   wherein at least one shape of the normalized gradient profile that has perfect reflection symmetry is either rejected or causes a reduction of the relative extent.

2. The method of claim 1, wherein the n different shape measures do not depend on detection of another edge.

3. The method of claim 1, wherein one of the n different shape measures is compared with a threshold that is determined by the rest of the n different shape measures.

4. The method of claim 1, wherein the relative extent is a function of the n-tuple.

5. The method of claim 1, wherein the relative extent is a weight for the edge in contributing to the focus signal.

6. The method of claim 1, wherein each edge that contributes to the focus signal contributes an edge-sharpness measure that is a quantity that is computed from a plurality of samples of image data within a predetermined neighborhood of said each edge, wherein the edge-sharpness measure has a unit that is a power of a unit of length, given that each sample of image data has a unit that is a unit of energy, that a distance between a pair of gradients and a count of pixels both have a unit that is a unit of length, that a difference between a pair of samples of image data divided by a distance between the pair of samples has a unit that is a unit of energy divided by a unit of length, that gradient value has a unit that is a unit of energy divided by a unit of length, and that normalized gradient values are unitless.

7. The method of claim 6, wherein the edge-sharpness measure is also one of the n different shape measures.

8. The method of claim 6, wherein the edge-sharpness measure is not part of the n different shape measures.

9. The method of claim 8, wherein the edge-sharpness measure is not evaluated for an edge that is not permitted to contribute to the focus signal.

10. The method of claim 8, wherein the edge-sharpness measure involves determining a width of a predefined portion of said each edge predefined according to a predetermined manner.

11. The method of claim 8, wherein the edge-sharpness measure is a peak gradient value of said each edge divided by an edge contrast across said each edge or by a contrast over a predefined portion of said each edge.

12. The method of claim 8, wherein the edge-sharpness measure is a second moment of gradients from a sequence of gradients across said each edge.

13. The method of claim 1, wherein each one of the plurality of edges consists of a plurality of pixels arrayed contiguously in a first direction and is detected by an edge detector.

14. The method of claim 13, wherein the edge detector detects said each edge using a first-order edge detection operator.

15. The method of claim 6, wherein different edges have different neighborhood of pixels from which the n different shape measures and the edge-sharpness measure of the respective one of the different edges are computed.

16. The method of claim 1, wherein the n different shape measures change by less than 10% for a 20% downscaling of image data of the image.

17. The method of claim 1, wherein at least one of the n different shape measures is any one of a normalized gradient value, a difference between normalized gradient values, a first derivative of normalized gradient, and an area under the normalized gradients plotted against distance, normalizing being dividing by a peak gradient value or by an interpolated peak gradient value of said any edge.

18. The method of claim 1, wherein the relative extent assigns different values to different shapes of the normalized gradient profile that have perfect reflection symmetry.

19. The method of claim 1, wherein there is a spurious sequence of gradients having perfect reflection symmetry such that the relative extent is necessarily reduced where the edge has the spurious sequence of gradients.

20. The method of claim 1, wherein the n different shape measures include a pair of shape measures neither of which is computed from one positive gradient and one negative gradient for said any edge.

21. The method of claim 1, wherein a 20% decrease in an illumination of the scene does not result in a difference between whether the edge is omitted or allowed to contribute to the focus signal.

22. The method of claim 6, wherein the edge-sharpness measure is further corrected for a slant of said each edge by multiplying with a correction factor that is a width correction factor raised to the power, the width correction factor being a multiplier less than one that projects, to within 10% accuracy, a width in a first direction in which pixels of said each edge are arrayed to a second direction that makes an angle $\phi$ with the first direction, where $\tan(\phi)$ is a ratio of a gradient perpendicular to the first direction to a gradient in the first direction.

* * * * *